United States Patent
Kim

(10) Patent No.: US 10,917,586 B2
(45) Date of Patent: Feb. 9, 2021

(54) ELECTRONIC DEVICE PROVIDING SWITCHING BETWEEN SIGNALS OUTPUT FROM CONCURRENTLY OPERABLE IMAGE SENSORS

(71) Applicant: SAMSUNG ELECTRONICS CO., LTD., Suwon-Si (KR)

(72) Inventor: Teahyung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 16/058,700

(22) Filed: Aug. 8, 2018

(65) Prior Publication Data

US 2019/0068893 A1     Feb. 28, 2019

(30) Foreign Application Priority Data

Aug. 22, 2017 (KR) .................. 10-2017-0106287
Jul. 2, 2018 (KR) .................. 10-2018-0076409

(51) Int. Cl.
  *H04N 5/268*     (2006.01)
  *H04N 5/232*     (2006.01)
  (Continued)

(52) U.S. Cl.
  CPC .............. *H04N 5/268* (2013.01); *G06F 3/00* (2013.01); *H04N 5/2258* (2013.01);
  (Continued)

(58) Field of Classification Search
  CPC ............ H04N 5/268; H04N 5/232933; H04N 5/232411; H04N 5/2258; H04N 5/23216;
  (Continued)

(56) References Cited

U.S. PATENT DOCUMENTS 7,683,962 B2   3/2010   Border et al.
7,864,227 B2   1/2011   Aoyama
(Continued)

FOREIGN PATENT DOCUMENTS

CN   106791378 A   5/2017
JP   2005223766 A   8/2005
(Continued)

*Primary Examiner* — Mishawn N. Hunter
(74) *Attorney, Agent, or Firm* — Volentine, Whitt & Francos, PLLC

(57) ABSTRACT

An electronic device includes an input interface, a wide-angle sensor, a telephoto sensor, and an output interface. The input interface receives a zoom magnification. The wide-angle sensor operates when the zoom magnification is smaller than a first reference magnification. The telephoto sensor operates when the zoom magnification is greater than a second reference magnification, which is smaller than the first reference magnification. The telephoto sensor operates concurrently with the wide-angle sensor when the zoom magnification is between the second reference magnification and the first reference magnification. The output interface outputs a first image based on a first signal from the wide-angle sensor when the zoom magnification is smaller than a switching magnification, which is between the second
(Continued)

reference magnification and the first reference magnification. The output interface outputs a second image based on a second signal from the telephoto sensor when the zoom magnification is greater than the switching magnification.

20 Claims, 16 Drawing Sheets

(51) Int. Cl.
*H04N 5/225* (2006.01)
*G06F 3/00* (2006.01)
*H04N 5/247* (2006.01)

(52) U.S. Cl.
CPC ..... *H04N 5/23216* (2013.01); *H04N 5/23238* (2013.01); *H04N 5/23245* (2013.01); *H04N 5/23296* (2013.01); *H04N 5/232411* (2018.08); *H04N 5/232933* (2018.08); *H04N 5/247* (2013.01)

(58) Field of Classification Search
CPC ........... H04N 5/23238; H04N 5/23245; H04N 5/23296; H04N 5/247
See application file for complete search history.

(56) References Cited

U.S. PATENT DOCUMENTS

| | | |
|---|---|---|
| 8,553,095 B2 | 10/2013 | Lee |
| 9,503,651 B2 | 11/2016 | Kim et al. |
| 9,661,233 B2 | 5/2017 | Shabtay et al. |
| 2007/0024737 A1 | 2/2007 | Nakamura et al. |
| 2007/0188650 A1* | 8/2007 | Kobayashi ......... H04N 5/23296 348/344 |
| 2014/0150094 A1* | 5/2014 | Rao ..................... H04L 63/1458 726/22 |
| 2016/0241793 A1 | 8/2016 | Ravirala et al. |
| 2016/0360103 A1 | 12/2016 | Griffith et al. |
| 2017/0150062 A1 | 5/2017 | Makinen et al. |
| 2017/0186166 A1 | 6/2017 | Grunnet-Jepsen et al. |
| 2018/0152623 A1 | 5/2018 | Li |

FOREIGN PATENT DOCUMENTS

| | | |
|---|---|---|
| JP | 2010524279 A | 7/2010 |
| KR | 101477542 B1 | 12/2014 |
| WO | WO2017025822 A1 | 2/2017 |

* cited by examiner

ELECTRONIC DEVICE PROVIDING SWITCHING BETWEEN SIGNALS OUTPUT FROM CONCURRENTLY OPERABLE IMAGE SENSORS

CROSS-REFERENCE TO RELATED APPLICATIONS

The present application claims priority under 35 U.S.C. § 119 to Korean Patent Applications No. 10-2017-0106287 filed on Aug. 22, 2017 and No. 10-2018-0076409 filed on Jul. 2, 2018 in Korean Intellectual Property Office, the disclosures of which are incorporated by reference herein in their entireties.

TECHNICAL FIELD

The present disclosure relates to an electronic device, and more particularly, relates to configurations and operations of an electronic device for capturing an image.

DESCRIPTION OF RELATED ART

Recently, various kinds of electronic devices are widely being used. An electronic device performs its own functions according to operations of electronic circuits included in the electronic device. The electronic device provides services to a user by performing its own functions.

For example, an image capturing device is an example of various electronic devices. The image capturing device is used to capture an image, including an object and a background, intended by the user. The image capturing device includes various electronic circuits to collect light and to generate a signal associated with the image, and provides the user with a service of capturing the image according to operations of the electronic circuits.

Meanwhile, the image capturing device is widely being supplied and is being used by many users. Accordingly, there is a need to satisfy various requirements of users with regard to performance and purpose of the image capturing device.

For example, it may be required to increase processing performance and operating speed of the image capturing device to improve the user satisfaction. For example, it may be required to suitably control an operation manner of the image capturing device to reduce power consumed by the image capturing device. As such, schemes for improving a structure and an operation of the image capturing device are being proposed to satisfy various requirements of the users.

SUMMARY

Example embodiments of the present disclosure may provide an electronic device which includes concurrently operable image sensors. In the example embodiments, the electronic device may control operations of the image sensors and relevant circuits to provide natural switching between images output according to the operations of the image sensors.

In some example embodiments, an electronic device may include an input interface, a wide-angle sensor, a telephoto sensor, and an output interface. The input interface may receive a zoom magnification. The wide-angle sensor may operate when the received zoom magnification is smaller than a first reference magnification. The telephoto sensor may operate when the received zoom magnification is greater than a second reference magnification which is smaller than the first reference magnification, and may operate concurrently with the wide-angle sensor when the received zoom magnification is between the second reference magnification and the first reference magnification. The output interface may output a first image based on a first signal from the wide-angle sensor when the received zoom magnification is smaller than a switching magnification which is between the second reference magnification and the first reference magnification, and may output a second image based on a second signal from the telephoto sensor when the received zoom magnification is greater than the switching magnification.

In some example embodiments, an electronic device may include a first image sensor and a second image sensor. The first image sensor may output a first signal when a first reference condition is satisfied. The second image sensor may output a second signal when a second reference condition different from the first reference condition is satisfied. When both the first reference condition and the second reference condition are satisfied, the first image sensor may output the first signal concurrently with the second image sensor outputting the second signal. When the first reference condition becomes not being satisfied while the first image sensor outputs the first signal, the first image sensor may output the first signal during a reference time interval after the first reference condition becomes not being satisfied, and then may not output the first signal. The second image sensor may output the second signal while the first image sensor does not output the first signal.

In some example embodiments, an electronic device may include a first image sensor and a second image sensor. The first image sensor may operate when a first reference condition is satisfied. The second image sensor may operate when a second reference condition different from the first reference condition is satisfied. When the second reference condition becomes satisfied while only the first image sensor operates, the first image sensor may operate while the second image sensor prepares to operate. After the second image sensor completes preparation to operate, the first image sensor and the second image sensor may operate concurrently during a provision time interval.

In some example embodiments, an electronic device may include a first image sensor, a second image sensor, and a main processor. The first image sensor may output a first signal when a first reference condition is satisfied. The second image sensor may output a second signal when a second reference condition different from the first reference condition is satisfied, and may output the second signal concurrently with the first image sensor outputting the first signal when both the first reference condition and the second reference condition are satisfied. The main processor may generate final image data based on the output first signal in a first time interval, and may generate the final image data based on the output second signal in a second time interval following the first time interval. In the first time interval and the second time interval, the first image sensor and the second image sensor may output the first signal and the second signal concurrently.

In some example embodiments, an electronic device includes a first image sensor, a second image sensor, and an image signal processor. The first image sensor generates a first image signal, and the second image sensor generates a second image signal. The image signal processor: (1) receives each of the first image signal and the second image signal, (2) selects, based upon a magnification factor, either the first image signal or the second image signal as a selected image signal, (3) magnifies the selected image signal by the magnification factor to generate a processed image signal, and (4) instructs, with a first instruction, the first image sensor to discontinue generating the first image signal in response to determining the magnification factor exceeds a reference magnification value by a first margin.

According to the example embodiments, switching between signals output from image sensors may be smoothly provided, and thus switching between images output according to operations of the image sensors may be natural and fast. In addition, power consumption of the image sensors and an electronic device may be reduced. Accordingly, a user may feel naturalness without perceiving the switching between the images, and user satisfaction may be improved.

BRIEF DESCRIPTION OF THE DRAWINGS

The above and other objects and features of the present disclosure will become apparent from the following descriptions with reference to the accompanying figures.

DETAILED DESCRIPTION

Below, some example embodiments will be described in detail and clearly with reference to the accompanying drawings such that those skilled in the art can easily implement the present disclosure.

Figure 1:
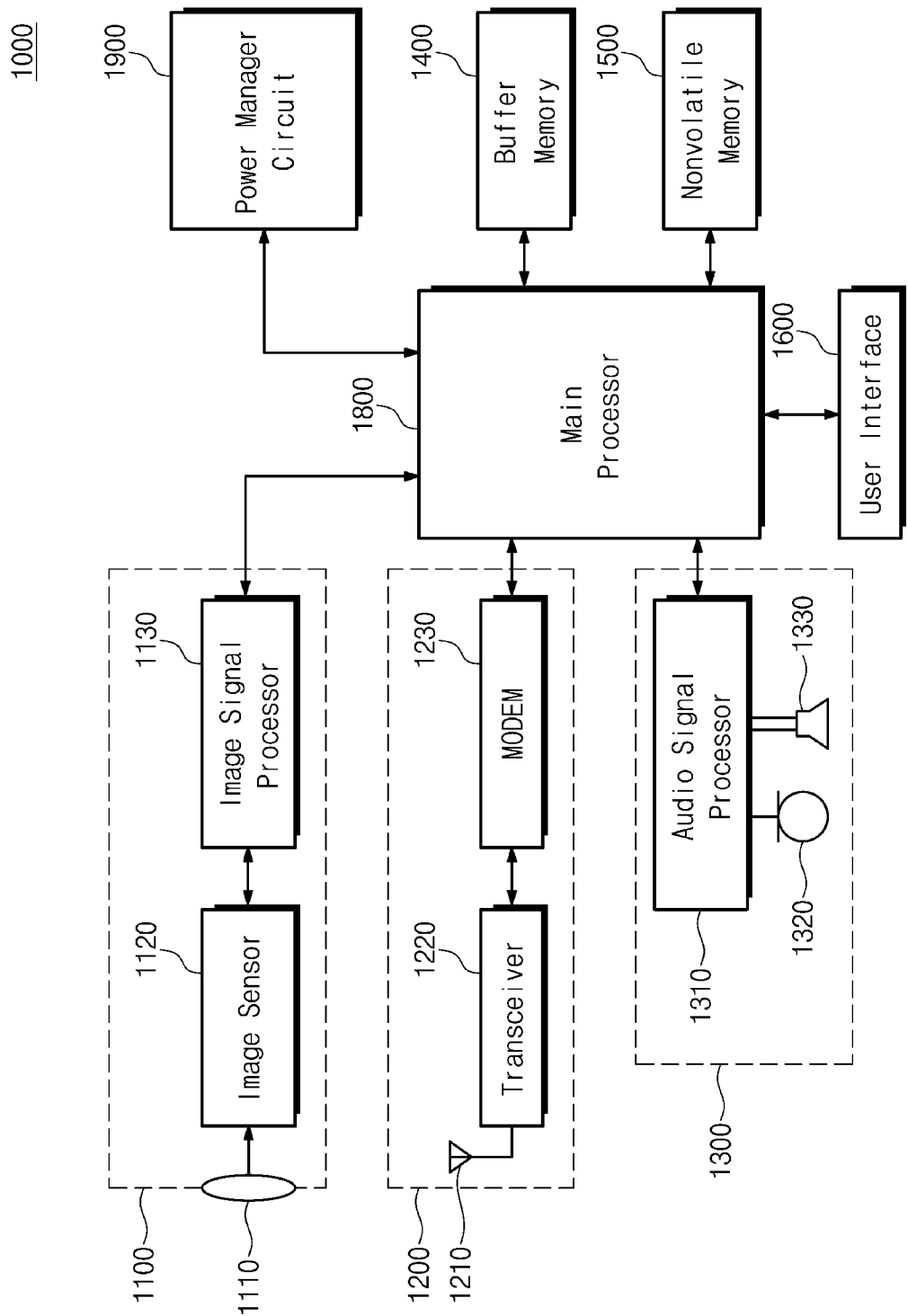
FIG. 1 is a block diagram illustrating an example configuration of an electronic device which includes an electronic circuit configured and operating according to example embodiments.

FIG. 1 is a block diagram illustrating an example configuration of an electronic device 1000 which includes an electronic circuit configured and operating according to example embodiments.

The electronic device 1000 may include various electronic circuits. For example, the electronic circuits of the electronic device 1000 may include an image processing block 1100, a communication block 1200, an audio processing block 1300, a buffer memory 1400, a nonvolatile memory 1500, a user interface 1600, a main processor 1800, and a power manager circuit 1900.

The image processing block 1100 may include a lens 1110, an image sensor 1120, and an image signal processor 1130. For example, light may be reflected from an external object intended by a user, and the lens 1110 may receive the reflected light. The image sensor 1120 may generate an electrical signal based on the light received through the lens 1110. The image signal processor 1130 may generate data associated with an image of the external object by suitably processing the electrical signal generated by the image sensor 1120.

The image sensor 1120 may generate an electrical signal so as to be suitable for expressing the external object intended by the user. For example, the image sensor 1120 may include pixels which are arranged along rows and columns and are able to convert light to an electrical signal. Characteristics (e.g., a current intensity, a voltage amplitude, and/or the like) of the electrical signal may vary according to a characteristic (e.g., intensity) of the received light. For example, the image sensor 1120 may be a charge coupled device (CCD) sensor, a complementary metal-oxide-semiconductor (CMOS) sensor, and/or the like.

Figure 2:
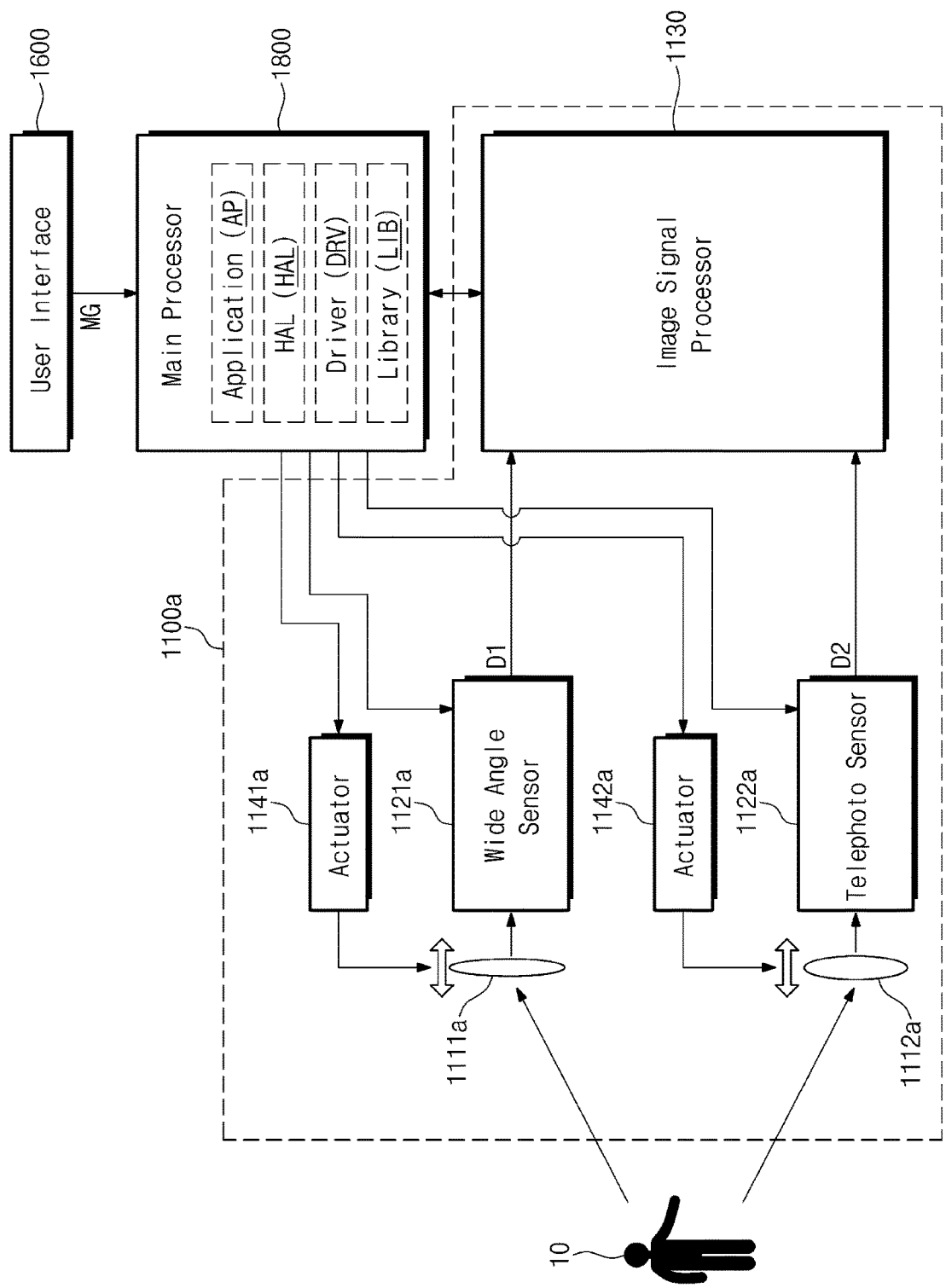
FIG. 2 is a block diagram illustrating an example configuration associated with an image processing block of FIG. 1.
Figure 15:
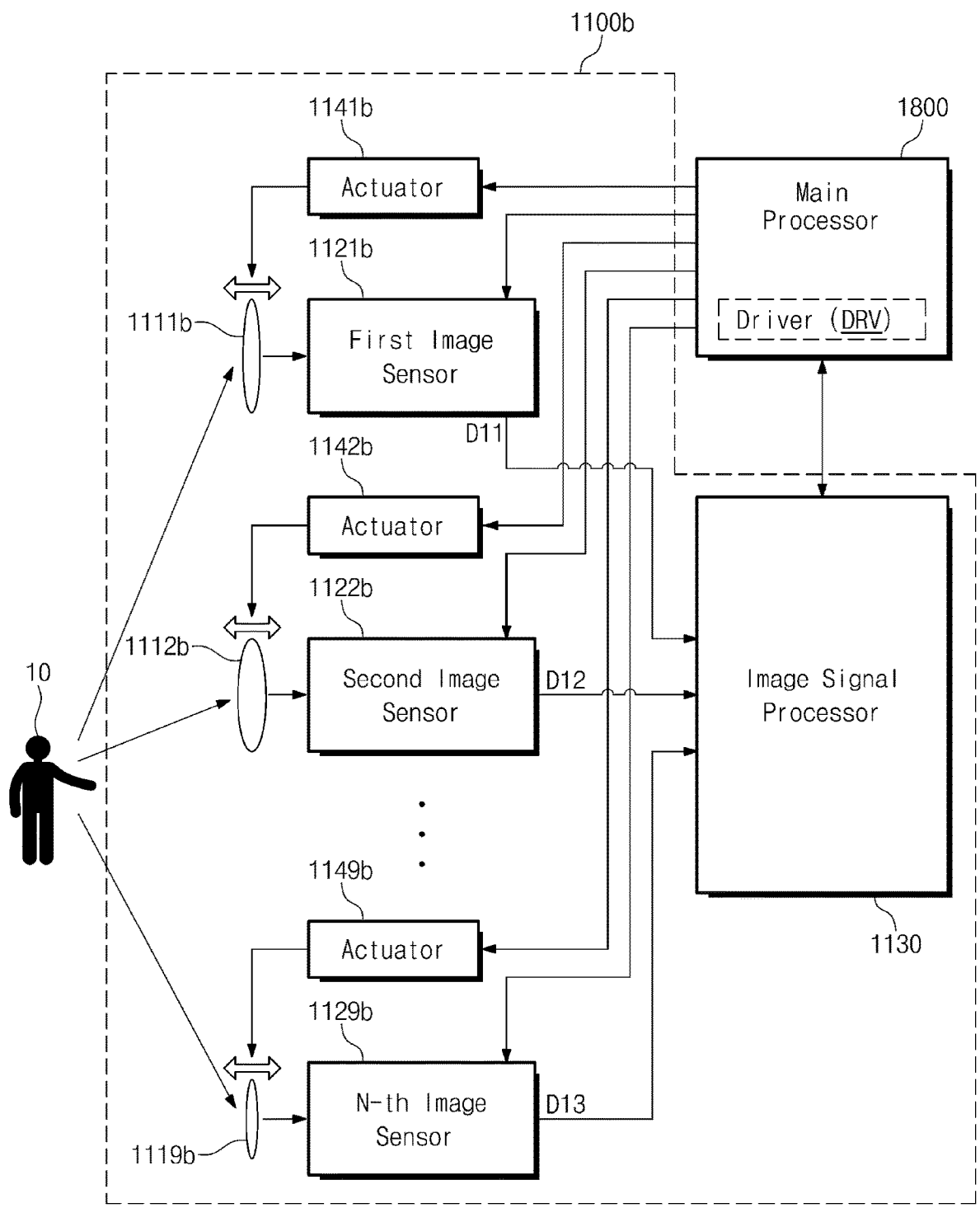
FIG. 15 is a block diagram illustrating an example configuration associated with an image processing block of FIG. 1.

FIG. 1 illustrates one lens 1110 and one image sensor 1120. However, in some example embodiments, the image processing block 1100 may include a plurality of lenses and a plurality of image sensors, and FIGS. 2 and 15 illustrate such example embodiments. The plurality of image sensors may be provided to have different functions, different capabilities, and/or different characteristics, and the plurality of lenses may be provided to correspond to the plurality of image sensors respectively.

The image signal processor 1130 may include hardware circuits (e.g., an analog circuit, a logic circuit, and/or the like) which are configured to perform operations described in the present disclosure. Additionally or alternatively, the image signal processor 1130 may include one or more processor cores, and may execute a program code configured to provide operations described in the present disclosure.

FIG. 1 illustrates that the image signal processor 1130 is included in the image processing block 1100. However, in some example embodiments, the image signal processor 1130 may be provided as a part of the image sensor 1120, may be provided on a circuit or chip separately from the image processing block 1100, and/or may be provided as a part of the main processor 1800. It will be readily understood that the present disclosure may be variously changed or modified without being limited to the illustration of FIG. 1.

The communication block 1200 may exchange signals with an external device/system through an antenna 1210. A transceiver 1220 and a modulator/demodulator (MODEM)

1230 of the communication block 1200 may process the exchanged signals in compliance with various communication protocols.

The audio processing block 1300 may process sound information by using an audio signal processor 1310. The audio processing block 1300 may receive an audio input through a microphone 1320, or may output an audio through a speaker 1330.

The buffer memory 1400 may temporarily store data which is used in an operation of the electronic device 1000 (e.g., data processed or to be processed by the main processor 1800). For example, the buffer memory 1400 may include a volatile/nonvolatile memory such as a static random access memory (SRAM), a dynamic RAM (DRAM), a synchronous DRAM (SDRAM), a phase-change RAM (PRAM), a magneto-resistive RAM (MRAM), a resistive RAM (ReRAM), a ferro-electric RAM (FRAM), and/or the like.

The nonvolatile memory 1500 may store data regardless of power being supplied. For example, the nonvolatile memory 1500 may include a nonvolatile memory such as a flash memory, a PRAM, an MRAM, a ReRAM, an FRAM, and/or the like.

The user interface 1600 may arbitrate communication between a user and the electronic device 1000. For example, the user interface 1600 may include input interfaces such as a keypad, a button, a touch screen, a touch pad, a vision sensor, a motion sensor, a gyroscope sensor, and/or the like. For example, the user interface 1600 may include output interfaces such as a liquid crystal display (LCD) device, a light emitting diode (LED) display device, an organic LED (OLED) display device, an active matrix OLED (AMOLED) display device, a motor, an LED lamp, and/or the like.

The main processor 1800 may perform various operations to control overall operations of the electronic device 1000. For example, the main processor 1800 may be implemented in a general-purpose processor, a special-purpose processor, or an application processor, and may include one or more processor cores.

The power manager circuit 1900 may suitably convert power received from a battery or an external power source. The power manager circuit 1900 may supply the converted power to components of the electronic device 1000.

However, the example components illustrated in FIG. 1 are provided to facilitate better understanding, and are not intended to limit the present disclosure. The electronic device 1000 may not include one or more of the components illustrated in FIG. 1, or may further include at least one component not illustrated in FIG. 1.

FIG. 2 is a block diagram illustrating an example configuration associated with the image processing block 1100 of FIG. 1. For example, the image processing block 1100 of FIG. 1 may include an image processing block 1100a of FIG. 2.

The image processing block 1100a may be implemented in a dual sensor structure including two image sensors 1121a and 1122a. The image processing block 1100a may include lenses 1111a and 1112a, the image sensors 1121a and 1122a, and the image signal processor 1130. Each of the lenses 1111a and 1112a may correspond to the lens 1110 of FIG. 1, and each of the image sensors 1121a and 1122a may correspond to the image sensor 1120 of FIG. 1.

For example, an object 10 may be any target (e.g., a person, a thing, scenery, or the like) which a user of the electronic device 1000 intends to capture. In response to a request of the user, the image processing block 1100a may generate a signal and data associated with an image of the object 10 under control of the main processor 1800.

Light may be reflected from the object 10, and the reflected light may be received through the lenses 1111a and 1112a. The light collected by the lens 1111a may be provided to a wide-angle sensor 1121a, and the light collected by the lens 1112a may be provided to a telephoto sensor 1122a.

For example, the lens 1111a may receive light at a wider angle than the lens 1112a. The lens 1111a may collect light reflected from the scenery at a wide area. On the other hand, the lens 1112a may receive light at a narrower angle than the lens 1111a. However, the lens 1112a may collect light reflected from an object at a far distance.

Accordingly, the image sensors 1121a and 1122a may be provided to have different functions, different capabilities, and/or different characteristics. For example, the wide-angle sensor 1121a may generate an electrical signal associated with the scenery at a wide area, and the telephoto sensor 1122a may generate an electrical signal associated with an object at a far distance.

Therefore, the image sensors 1121a and 1122a of FIG. 2 may generate the electrical signals to capture an image flexibly irrespective of a location of the object 10. For example, the wide-angle sensor 1121a may generate a signal D1, and the telephoto sensor 1122a may generate a signal D2. The signals D1 and D2 may be electrical signals associated with expressing an image of the object 10.

In some example embodiments, the image processing block 1100a may further include actuators 1141a and 1142a to adjust focal lengths of the lenses 1111a and 1112a. The actuator 1141a may move a position of the lens 1111a, and thus a focal length of the lens 1111a may be adjusted. The actuator 1142a may move a position of the lens 1112a, and thus a focal length of the lens 1112a may be adjusted. For example, the actuators 1141a and 1142a may include a physical device such as a motor.

The image signal processor 1130 may receive the signals D1 and D2 generated by the wide-angle sensor 1121a and the telephoto sensor 1122a. The image signal processor 1130 may process the signals D1 and D2. For example, the image signal processor 1130 may perform a variety of signal processing such as bad pixel correction, demosaic, noise reduction, lens shading correction, gamma correction, edge enhancement, and/or the like.

The image signal processor 1130 may perform signal processing on the signals D1 and D2 and may output the processed signals D1 and D2 associated with the image of the object 10 to the main processor 1800. The main processor 1800 may generate final image data based on signals received from the image signal processor 1130.

For example, the final image data may be stored in an internal memory of the main processor 1800, the buffer memory 1400, and/or the nonvolatile memory 1500. The final image data may indicate attributes (such as a shape, a color, a motion, and/or the like) of the object 10. The final image data may be used to display an image on an output interface (e.g., a display device) of the user interface 1600. Accordingly, the output interface may output an image based on the signal D1 or an image based on the signal D2.

The main processor 1800 may control operations of the image sensors 1121a and 1122a, the image signal processor 1130, and the actuators 1141a and 1142a. For example, the main processor 1800 may control operation timings of the image sensors 1121a and 1122a, the image signal processor 1130, and the actuators 1141a and 1142a in response to a user request (e.g., a button push, a screen touch, a motion, a gesture, and/or the like) recognized through the user interface 1600.

Under control of the main processor 1800, each of the lenses 1111a and 1112a and the image sensors 1121a and 1122a may be used or may not be used. For example, when the user intends to capture an image of the scenery at a wide area, the final image data may be generated through the lens 1111a and the wide-angle sensor 1121a under control of the main processor 1800. On the other hand, when the user intends to capture an image of an object at a far distance, the final image data may be generated through the lens 1112a and the telephoto sensor 1122a under control of the main processor 1800.

For example, the user may input information of "zoom-in" or "zoom-out" to an input interface of the user interface 1600 to capture an image. The zoom-in information may be associated with capturing an image of an object at a far distance, and the zoom-out information may be associated with capturing an image of the scenery or an object at a wide area.

For example, the information of zoom-in or zoom-out may include information of zoom magnification. The zoom magnification may be a value indicating how far is an object to be captured or how wide is an area associated with an object to be captured. For example, the user may set a zoom condition for capturing an intended image by increasing or decreasing a value of the zoom magnification slowly (e.g., stepwise or gradually) or by selecting a specific value of the zoom magnification. To this end, the input interface of the user interface 1600 may receive the zoom magnification from the user.

As the zoom magnification is received, the main processor 1800 may provide switching between an operation of the wide-angle sensor 1121a and an operation of the telephoto sensor 1122a. For example, when the zoom magnification increases (e.g., zoom-in), the telephoto sensor 1122a may primarily operate, and an object at a far distance may be better captured. For example, when the zoom magnification decreases (e.g., zoom-out), the wide-angle sensor 1121a may primarily operate, and an object at a wide area may be better captured. Accordingly, depending on a request of the user, the switching between the operation of the wide-angle sensor 1121a and the operation of the telephoto sensor 1122a may be provided.

The wide-angle sensor 1121a may output the signal D1 while operating, and may not output the signal D1 while not operating. The telephoto sensor 1122a may output the signal D2 while operating, and may not output the signal D2 while not operating. Switching between the signals D1 and D2 may be provided based on the switching between the operation of the wide-angle sensor 1121a and the operation of the telephoto sensor 1122a. Accordingly, switching between the image based on the signal D1 and the image based on the signal D2 may be provided.

Meanwhile, when a time taken for the switching between the operation of the wide-angle sensor 1121a and the operation of the telephoto sensor 1122a becomes long, the switching between the image based on the signal D1 and the image based on the signal D2 may become slow. For example, when the wide-angle sensor 1121a and the telephoto sensor 1122a operate exclusively to reduce power consumed by the wide-angle sensor 1121a and the telephoto sensor 1122a, the switching time may become long. In this case, image capturing may become unnatural, and the user satisfaction may be degraded. However, when the wide-angle sensor 1121a and the telephoto sensor 1122a operate fully concurrently to decrease the switching time, power consumption may increase, and the user satisfaction may be degraded.

Example embodiments of the present disclosure may provide the image processing block 1100a and the electronic device 1000 which operate taking into account both the power consumption and the user satisfaction. Some example embodiments will be described with reference to FIGS. 3 to 16.

The main processor 1800 may execute instruction sets of various program codes. For example, the main processor 1800 may execute instruction sets of an application AP, a camera hardware abstraction layer HAL, a camera driver DRV, an image processing library LIB, and/or the like. The application AP may be executed in response to a request of the user, and may be, for example, a camera application, a movie making application, and/or the like.

The camera hardware abstraction layer HAL may provide hardware abstraction to hide a complex hardware architecture from the user. The camera driver DRV may operate or control hardware components (e.g., the image sensors 1121a and 1122a and the actuators 1141a and 1142a), and may make the application AP interface with the hardware components. The image processing library LIB may provide a variety of information referenced to perform signal processing on the signals D1 and D2.

As the user inputs the zoom magnification to the input interface of the user interface 1600, the user interface 1600 may provide the information of the zoom magnification MG to the main processor 1800. The zoom magnification MG may be transferred through the camera hardware abstraction layer HAL and the camera driver DRV. Accordingly, the main processor 1800 may control the sensors 1121a and 1122a and the actuators 1141a and 1142a based on the zoom magnification MG.

Figure 3:
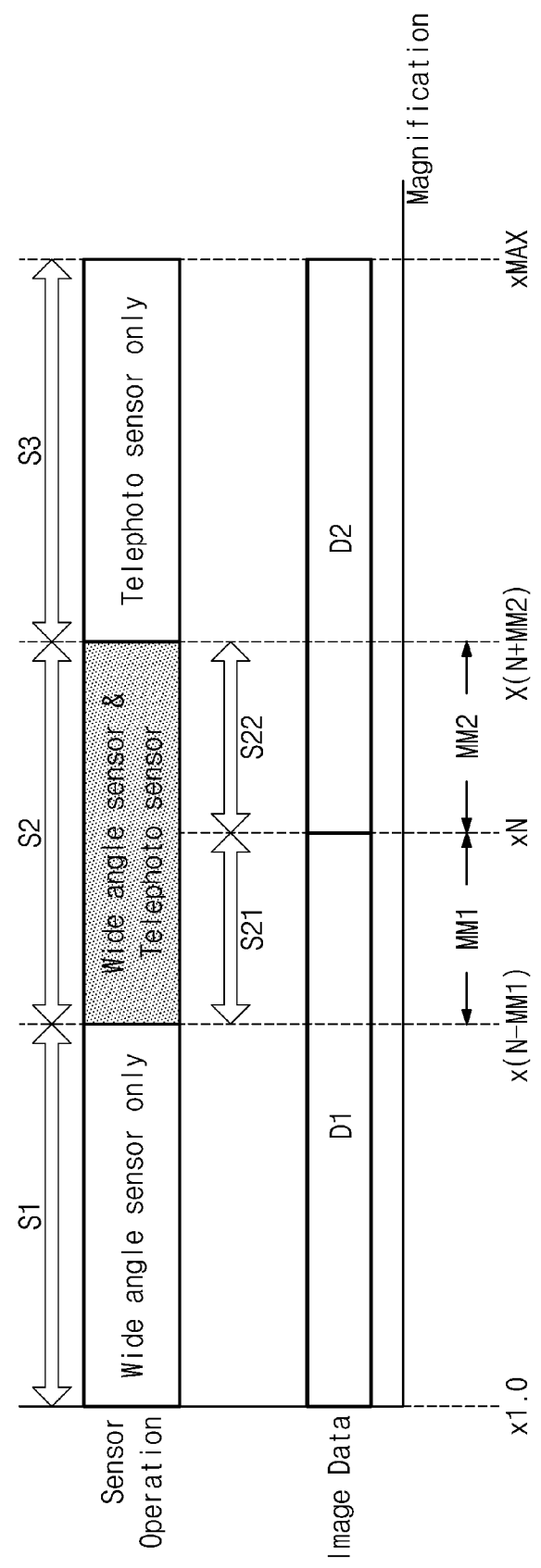
FIG. 3 is a conceptual diagram for describing example operations of image sensors of FIG. 2.

FIG. 3 is a conceptual diagram for describing example operations of the image sensors 1121a and 1122a of FIG. 2. In the following descriptions, "xP" (P being a real number) may mean a value of the zoom magnification MG.

The zoom magnification MG may have a value between "×1.0" and "xMAX". "×1.0" may be the minimum zoom magnification allowed in the image processing block 1100a, and "xMAX" may be the maximum zoom magnification allowed in the image processing block 1100a. Meanwhile, "xN" may be referred to as "switching magnification", and may be between "×1.0" and "xMAX".

When the zoom magnification MG is smaller than the switching magnification (e.g., between "×1.0" and "xN"), the main processor 1800 may generate the final image data based on the signal D1 output from the wide-angle sensor 1121a. Accordingly, the output interface of the user interface 1600 may output an image based on the signal D1.

On the other hand, when the zoom magnification MG is greater than the switching magnification (e.g., between "xN" and "xMAX"), the main processor 1800 may generate the final image data based on the signal D2 output from the telephoto sensor 1122a. Accordingly, the output interface may output an image based on the signal D2.

The switching between the signals D1 and D2 and the switching between the images may be provided based on the switching magnification. The switching magnification of "xN" may be understood as a switching condition for triggering the switching between the signals D1 and D2 and the switching between the images. According to the switching condition, the main processor 1800 may generate final image data based on one of the signals D1 and D2, and the output interface may output a final image based selectively on the signal D1 or the signal D2.

Meanwhile, in some example embodiments, margin intervals MM1 and MM2 may be provided from the zoom magnification of "xN". Accordingly, a magnification interval S1 may be provided between the zoom magnification of "×1.0" and the zoom magnification of "×(N−MM1)". A magnification interval S2 may be provided between the zoom magnification of "×(N−MM1)" and the zoom magnification of "×(N+MM2)" so as to include the margin intervals MM1 and MM2. A magnification interval S3 may be provided between the zoom magnification of "×(N+MM2)" and the zoom magnification of "xMAX". "×(N+MM2)" may be greater than "×(N−MM1)".

For example, only the wide-angle sensor 1121a may operate in the magnification interval S1, and only the telephoto sensor 1122a may operate in the magnification interval S3. The image sensors 1121a and 1122a may operate concurrently in the magnification interval S2. That is, in the margin intervals MM1 and MM2 before and after the switching magnification of "xN", all the image sensors 1121a and 1122a may operate instead of operating only one of the wide-angle sensor 1121a and the telephoto sensor 1122a.

The wide-angle sensor 1121a may operate and may output the signal D1 when a first reference condition is satisfied. For example, the first reference condition may be satisfied when the zoom magnification MG is smaller than "×(N+MM2)", and the wide-angle sensor 1121a may operate when the zoom magnification MG is smaller than "×(N+MM2)". When the first reference condition is satisfied, the image signal processor 1130 may receive the signal D1.

For example, the wide-angle sensor 1121a may not operate when the zoom magnification MG is greater than "×(N+MM2)". An operation of the wide-angle sensor 1121a in a case where the zoom magnification MG is "×(N+MM2)" may be suitably designed depending on an intention of a designer. The zoom magnification of "×(N+MM2)" may be understood as reference magnification associated with the operation of the wide-angle sensor 1121a.

The telephoto sensor 1122a may operate and may output the signal D2 when a second reference condition is satisfied. The second reference condition may be different from the first reference condition. For example, the second reference condition may be satisfied when the zoom magnification MG is greater than "×(N−MM1)", and the telephoto sensor 1122a may operate when the zoom magnification MG is greater than "×(N−MM1)". When the second reference condition is satisfied, the image signal processor 1130 may receive the signal D2.

For example, the telephoto sensor 1122a may not operate when the zoom magnification MG is smaller than "×(N−MM1)". An operation of the telephoto sensor 1122a in a case where the zoom magnification MG is "×(N−MM1)" may be suitably designed depending on an intention of a designer. The zoom magnification of "×(N−MM1)" may be understood as a reference magnification associated with the operation of the telephoto sensor 1122a.

The main processor 1800 may control the image sensors 1121a and 1122a based on the zoom magnification MG received through the user interface 1600 such that each of the image sensors 1121a and 1122a operates or does not operate. The main processor 1800 may control the operation of the wide-angle sensor 1121a based on the first reference condition. The main processor 1800 may control the operation of the telephoto sensor 1122a based on the second reference condition.

For example, operation of the image sensors 1121a and 1122a may mean that the image sensors 1121a and 1122a generate and output the signals D1 and D2 while consuming power. For example, non-operation of the image sensors 1121a and 1122a may mean that the image sensors 1121a and 1122a are turned off without power consumption or that the image sensors 1121a and 1122a are at a stand-by state with the minimum power consumption. For example, the operations of the image sensors 1121a and 1122a may be identified in terms of power consumption and/or a signal output.

When both the first reference condition and the second reference condition are satisfied (e.g., when the zoom magnification MG is between "×(N−MM1)" and "×(N+MM2)"), the image sensors 1121a and 1122a may operate concurrently and may output the signals D1 and D2. In this case, the image signal processor 1130 may process both the signals D1 and D2. However, the main processor 1800 may generate the final image data based on only one of the signals D1 and D2, according to the switching magnification of "xN".

The switching condition may be determined while both the first reference condition and the second reference condition are satisfied. For example, the switching magnification of "xN" may occur while the zoom magnification MG is between "×(N−MM1)" and "×(N+MM2)", and the main processor 1800 may determine whether the switching condition occurs, based on the received zoom magnification MG.

The main processor 1800 may determine which signal would be used to generate the final image data among the signals D1 and D2, based on the received zoom magnification MG. Accordingly, the main processor 1800 may provide the switching between the signals D1 and D2 according to the switching condition, and may generate the final image data based selectively on the signal D1 or the signal D2.

The magnification interval S2 may include magnification intervals S21 and S22. In the magnification interval S21, the image sensors 1121a and 1122a may operate concurrently. However, as the zoom magnification MG is smaller than the switching magnification of "xN", the main processor 1800 may generate the final image data based only on the signal D1, and the output interface may output an image based on the signal D1.

Meanwhile, in the magnification interval S22, the image sensors 1121a and 1122a may operate concurrently. However, as the zoom magnification MG is greater than the switching magnification of "xN", the main processor 1800 may generate the final image data based only on the signal D2, and the output interface may output an image based on the signal D2. When the zoom magnification MG is equal to xN, the main processor 1800 may generate the final image data based only on the signal D1 or only on the signal D2 and the output interface may output an image based on the respective signal D1 or D2.

For example, when the main processor 1800 determines the switching condition while the main processor 1800 and the output interface operate based on the signal D1 (e.g., when the zoom magnification MG changes from a magnification smaller than "xN" to a magnification greater than "xN"), the switching from the signal D1 to the signal D2 may be provided. Accordingly, after the switching, the main processor 1800 may generate the final image data based on the signal D2, and the output interface may output an image based on the signal D2.

On the other hand, when the main processor 1800 determines the switching condition while the main processor 1800 and the output interface operate based on the signal D2 (e.g., when the zoom magnification MG changes from a magnification greater than "xN" to a magnification smaller than "xN"), the switching from the signal D2 to the signal D1 may be provided. Accordingly, after the switching, the main processor 1800 may generate the final image data based on the signal D1, and the output interface may output an image based on the signal D1. That is, in response to the determination of the switching condition, the switching from one of the signals D1 and D2 to the other one of the signals D1 and D2 may be provided.

The margin intervals MM1 and MM2 of the magnification interval S2 may be provided to facilitate the fast switching between the signals D1 and D2 output from the image sensors 1121a and 1122a. For example, when the telephoto sensor 1122a operates to output the signal D2 in advance while the signal D1 is used, the switching from the signal D1 to the signal D2 may be rapidly provided in response to the determination of the switching condition. In this case, switching from an image based on the signal D1 to an image based on the signal D2 may become smooth and natural.

However, when the image sensors 1121a and 1122a operate concurrently in all of the magnification intervals S1, S2 and S3, power consumption of the electronic device 1000 and the image processing block 1100a may increase. Accordingly, only one of the image sensors 1121a and 1122a may operate in the magnification intervals S1 and S3, and thus power consumption may be reduced. As a result, the user satisfaction may be improved.

Operation states of the image sensors 1121a and 1122a may transition between the magnification intervals S1, S2, and S3 as time passes. This will be described with reference to FIGS. 4 to 13.

The first reference condition, the second reference condition, and the switching condition have been described with regard to magnification, but they are only some of possible examples and are not intended to limit the present disclosure. Conditions associated with operations of image sensors may be variously changed or modified depending on functions, capabilities, and/or characteristics of image sensors included in the electronic device 1000. However, to facilitate better understanding, some example embodiments will be described based on the first reference condition, the second reference condition, and the switching condition associated with the magnification.

Figure 4:
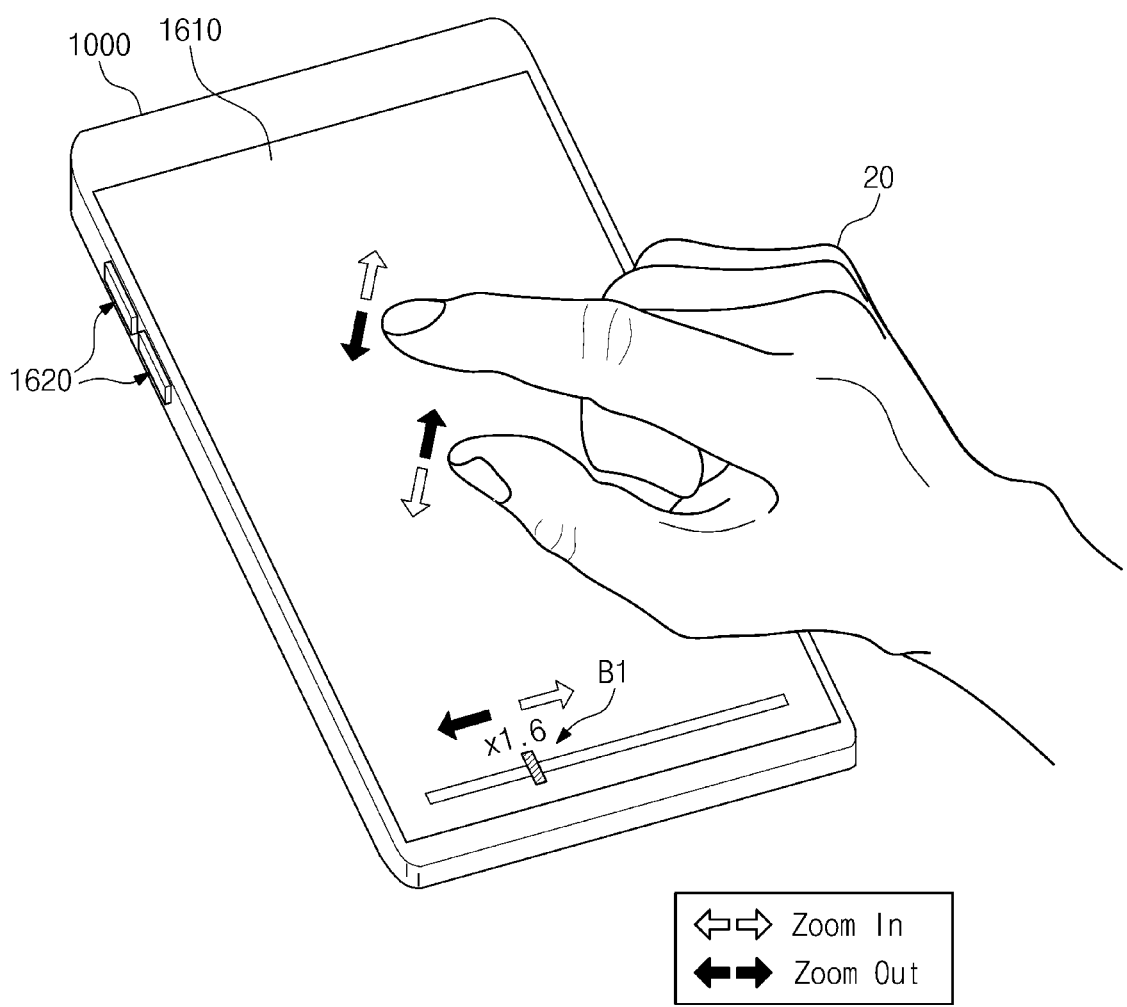
FIG. 4 is a conceptual diagram for describing an example method of inputting a zoom magnification for image sensors of FIG. 2 through a user interface of FIG. 2.

FIG. 4 is a conceptual diagram for describing an example method of inputting the zoom magnification MG for the image sensors 1121a and 1122a of FIG. 2 through the user interface 1600 of FIG. 2.

In some cases, a user 20 may intend to input the zoom magnification MG to the user interface 1600 while slowly increasing or decreasing a value of the zoom magnification MG. For example, the user 20 may touch a touch screen 1610 of the user interface 1600 with his/her two fingers. And then, the user 20 may take an action of widening or narrowing a distance between the two fingers to slowly adjust the value of the zoom magnification MG (pinch zoom-in or pinch zoom-out).

For another example, the user 20 may use a graphic interface B1 displayed on a display device of the user interface 1600 to adjust the value of the zoom magnification MG. The user 20 may slowly adjust the value of the zoom magnification MG by sliding his/her finger along a slide bar of the graphic interface B1. For still another example, the user 20 may push buttons 1620 of the user interface 1600 to slowly increase or decrease the value of the zoom magnification MG.

However, the above examples are provided to facilitate better understanding, and are not intended to limit the present disclosure. It may be readily understood that an interface for slowly adjusting the value of the zoom magnification MG may be variously changed or modified.

Figure 5:
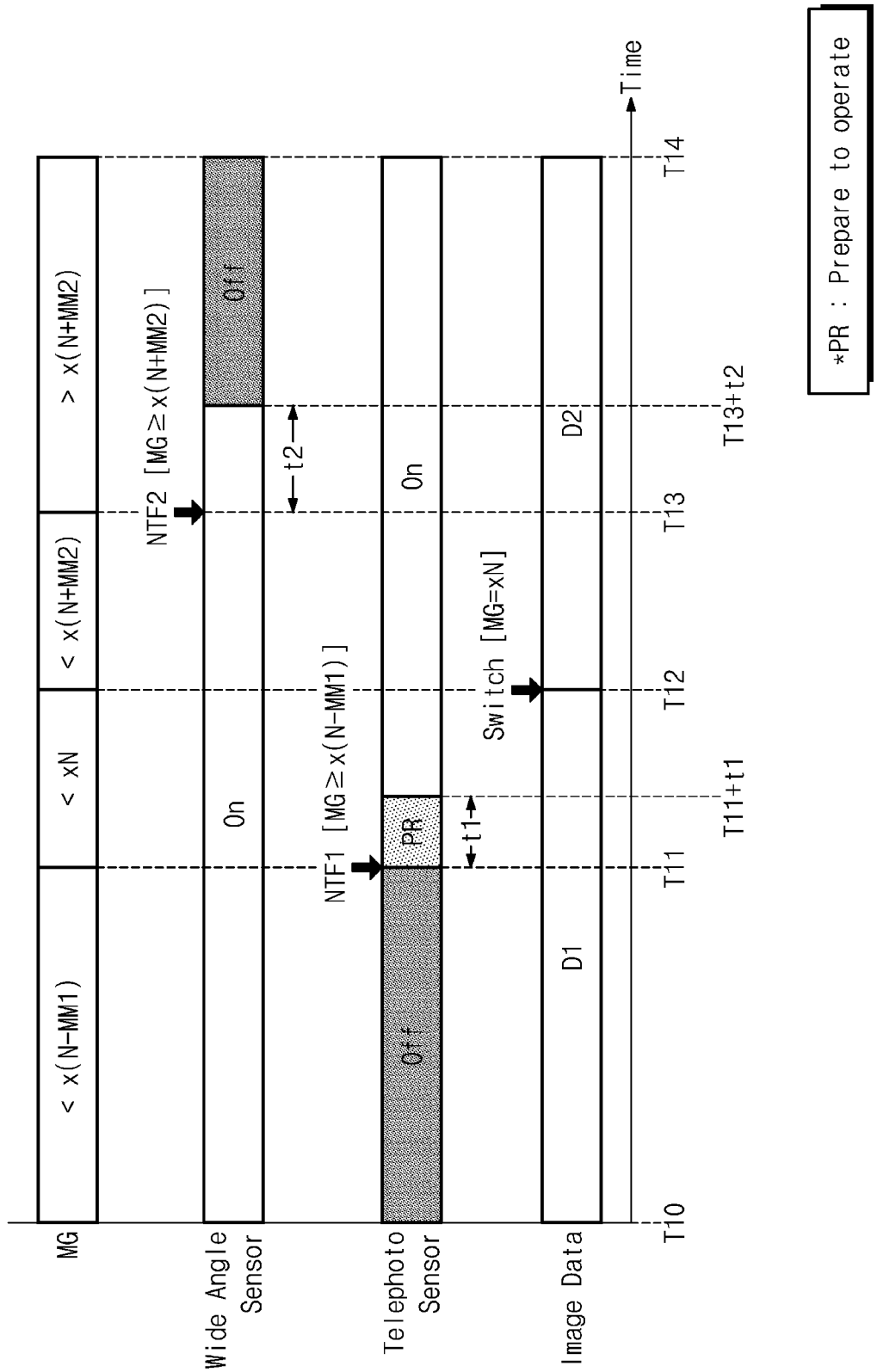
FIG. 5 is a timing diagram for describing example operations of image sensors of FIG. 2 associated with a zoom magnification input of FIG. 4.
Figure 6:
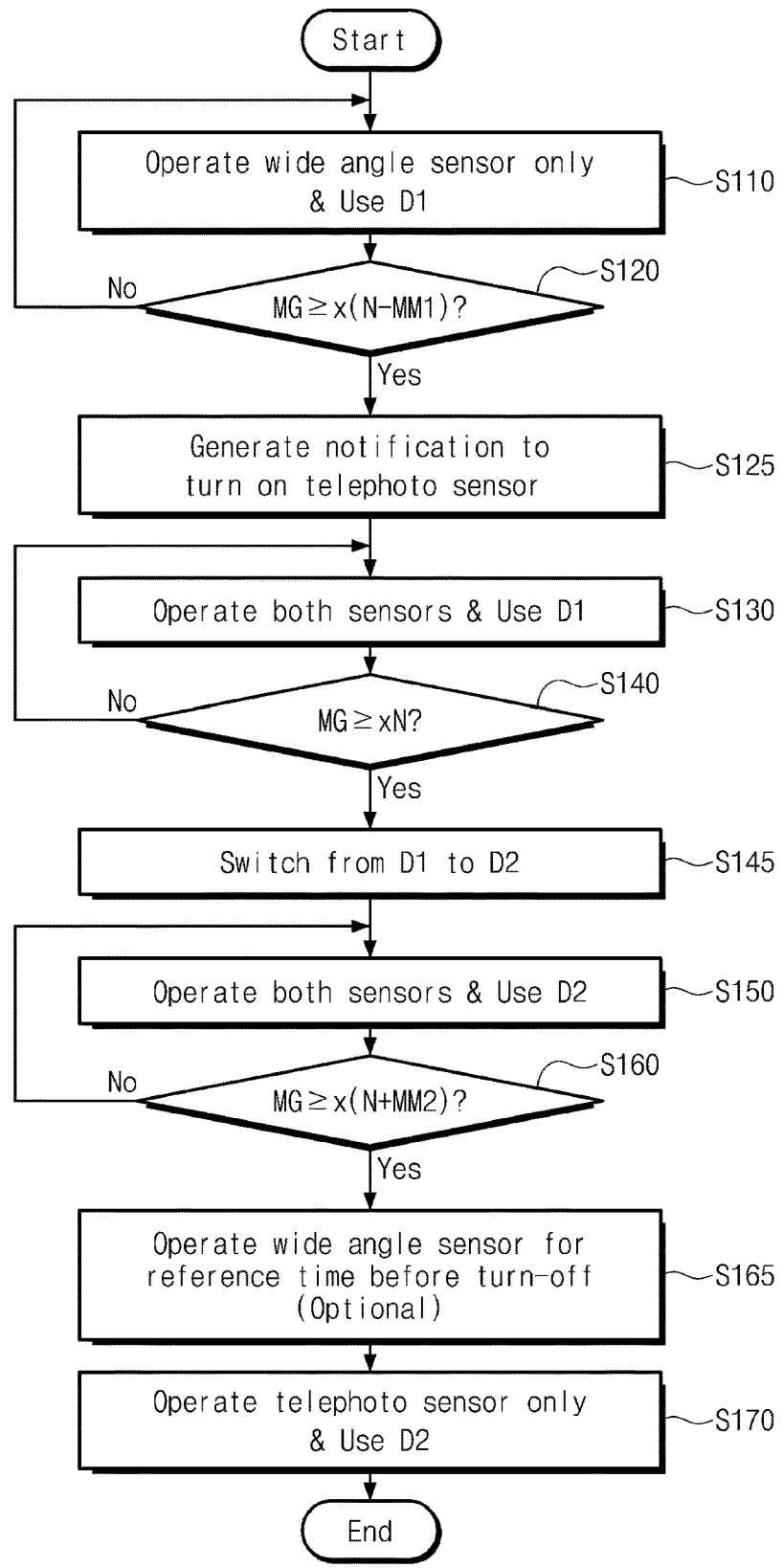
FIG. 6 is a flowchart describing example operations of image sensors of FIG. 2 associated with a zoom magnification input of FIG. 4.

FIG. 5 is a timing diagram for describing example operations of the image sensors 1121a and 1122a of FIG. 2 associated with a zoom magnification input of FIG. 4. FIG. 6 is a flowchart describing example operations of the image sensors 1121a and 1122a of FIG. 2 associated with a zoom magnification input of FIG. 4. FIGS. 5 and 6 may be associated with a case where the value of the zoom magnification MG slowly increases.

In a time interval between time T10 and T11, the zoom magnification MG may be smaller than the reference magnification of "×(N−MM1)". Only the wide-angle sensor 1121a may operate, and the telephoto sensor 1122a may not operate. The main processor 1800 may generate the final image data based on the signal D1, and the output interface may output an image based on the signal D1 (S110 of FIG. 6).

The main processor 1800 may determine whether the zoom magnification MG becomes greater than or equal to "×(N−MM1)" (S120 of FIG. 6). When the zoom magnification MG satisfies the second reference condition (e.g., when the zoom magnification MG becomes greater than or equal to "×(N−MM1)") while only the wide-angle sensor 1121a operates, the main processor 1800 may provide a notification NTF1 to the telephoto sensor 1122a (S125 of FIG. 6).

At time T11, the telephoto sensor 1122a may start to prepare to operate in response to the notification NTF1. For example, when the zoom magnification MG changes from a magnification smaller than "×(N−MM1)" to a magnification greater than or equal to "×(N−MM1)" while the telephoto sensor 1122a does not operate, the telephoto sensor 1122a may prepare to operate during a time interval t1 after the zoom magnification MG becomes to be greater than or equal to "×(N−MM1)", and then may operate. The time interval t1 may be a preparation time interval in which the telephoto sensor 1122a enters a state required to operate while starting to receive power. As the wide-angle sensor 1121a operates while the telephoto sensor 1122a prepares to operate, the main processor 1800 and the output interface may use the signal D1.

In a time interval between time T11 and T12, the zoom magnification MG may be between the reference magnification of "×(N−MM1)" and the switching magnification of "xN". After the telephoto sensor 1122a completes preparation to operate (PR), the image sensors 1121a and 1122a may operate concurrently in a time interval between time T11+t1 and T12. Before the switching condition is determined, the main processor 1800 may generate the final image data based only on the signal D1 without the signal D2, and the output interface may output an image based only on the signal D1 (S130 of FIG. 6).

While the image sensors 1121a and 1122a operate concurrently, the main processor 1800 may determine whether the zoom magnification MG becomes greater than or equal to "xN" (S140 of FIG. 6). When the zoom magnification MG becomes greater than or equal to "xN", the main processor 1800 may determine the switching condition, and thus may provide the switching from the signal D1 to the signal D2 at time T12 (S145 of FIG. 6).

A time interval between time T12 and T13 may follow the time interval between time T11 and T12. In the time interval between time T12 and T13, the zoom magnification MG may be between the switching magnification of "xN" and the reference magnification of "×(N+MM2)". The image sensors 1121a and 1122a may operate concurrently. In response to the switching condition, the main processor 1800 may generate the final image data based only on the signal D2 without the signal D1, and the output interface may output an image based only on the signal D2 (S150 of FIG. 6).

The main processor 1800 may determine whether the zoom magnification MG becomes greater than or equal to "×(N+MM2)" (S160 of FIG. 6). When the zoom magnification MG does not satisfy the first reference condition (e.g., when the zoom magnification MG becomes greater than or equal to "×(N+MM2)") while the wide-angle sensor 1121a outputs the signal D1, the main processor 1800 may provide a notification NTF2 to the wide-angle sensor 1121a.

In some example embodiments, after a lapse of time T13, the wide-angle sensor 1121a may immediately stop its operation in response to the notification NTF2. The wide-angle sensor 1121a may not operate after stopping operation. When the zoom magnification MG changes from a magnification smaller than "xN" to a magnification greater than "xN" while the wide-angle sensor 1121a operates, the wide-angle sensor 1121a may not operate after the zoom magnification MG becomes greater than or equal to "×(N+MM2)".

Alternatively, in some example embodiments, when the zoom magnification MG changes from a magnification smaller than "×(N+MM2)" to a magnification greater than or equal to "×(N+MM2)" while the wide-angle sensor 1121a operates, the wide-angle sensor 1121a may additionally operate during a time interval t2 after the zoom magnification MG becomes greater than or equal to "×(N+MM2)" (e.g., after time T13). And then, after a lapse of time T13+t2, the wide-angle sensor 1121a may not operate (S165 of FIG. 6). The time interval t2 may be a reference time interval for further operating the wide-angle sensor 1121a in response to the notification NTF2. The main processor 1800 and/or the wide-angle sensor 1121a may use a timer circuit, a counter circuit, and/or the like, to measure the reference time interval t2.

In a time interval between time T13 and T14, the zoom magnification MG may be greater than the reference magnification of "×(N+MM2)". After time T13 (or T13+t2), while the wide-angle sensor 1121a does not operate, only the telephoto sensor 1122a may operate. The main processor 1800 may generate the final image data based on the signal D2, and the output interface may output an image based on the signal D2 (S170 of FIG. 6).

While both the first and second reference conditions are satisfied, the image sensors 1121a and 1122a may output the signals D1 and D2 concurrently. As the telephoto sensor 1122a outputs the signal D2 in advance while operating in the time interval between time T11+t1 and T12, the switching from the signal D1 to the signal D2 may be rapidly provided in response to the switching magnification of "xN". The telephoto sensor 1122a may start to operate before the switching to the signal D2 is actually provided, and thus the switching time may become short.

In some example embodiments, when the reference time interval t2 is provided, even though a user suddenly decreases the value of the zoom magnification MG, a sufficient response time for re-switching to the signal D1 may be provided. Accordingly, the switching between the signals D1 and D2 may be stably provided. A length of the reference time interval t2 may be variously selected (e.g., as one second or thirty (30) frames) to be suitable for stable switching, and may be fixed or variable.

A time interval between time T11+t1 and T13 (or T13+t2) may be a provision time interval in which the image sensors 1121a and 1122a operate concurrently to provide fast switching between the signals D1 and D2. For example, the provision time interval between time T11+t1 and T13+t2 may include the reference time interval t2.

Figure 7:
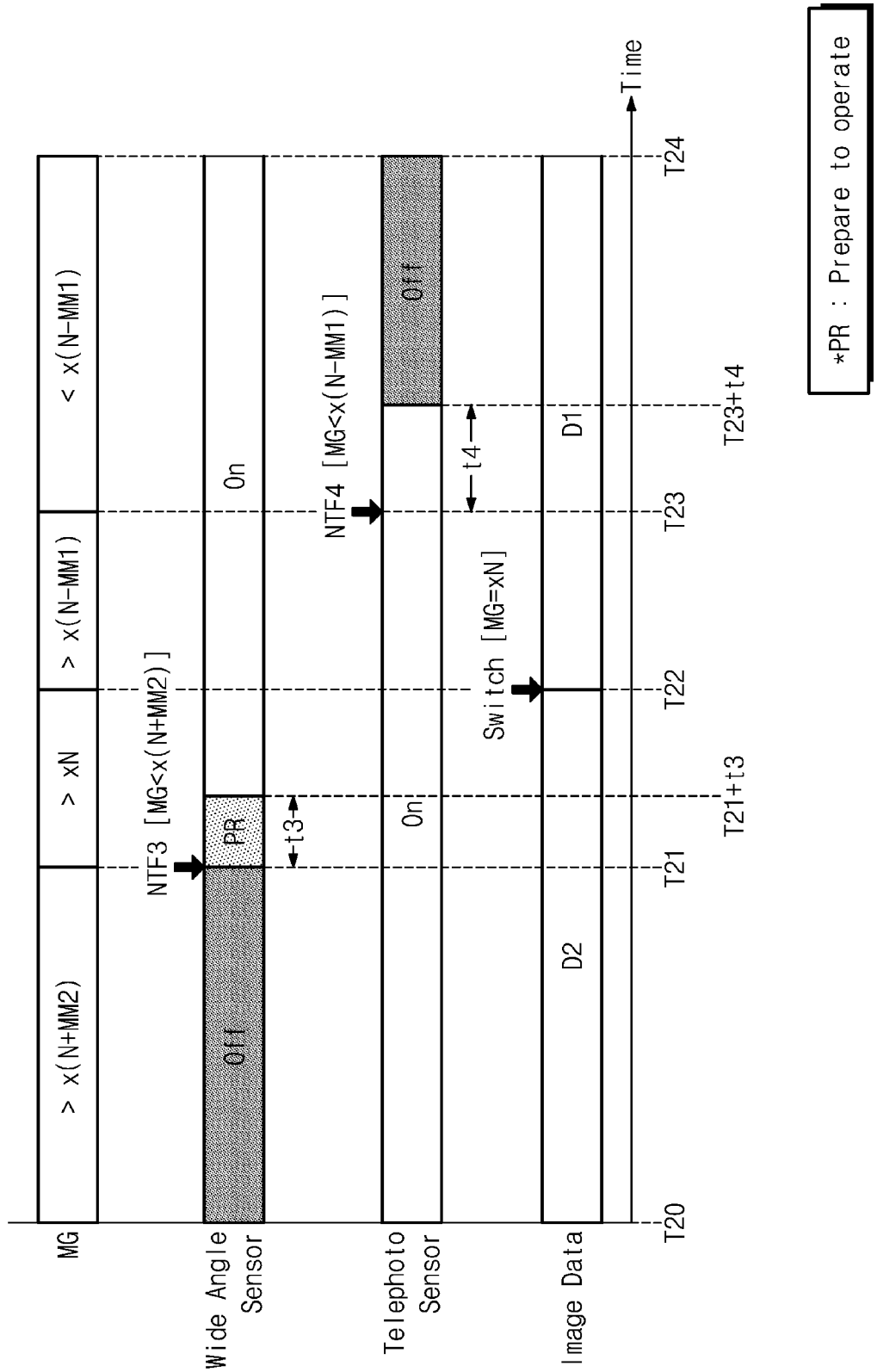
FIG. 7 is a timing diagram for describing example operations of image sensors of FIG. 2 associated with a zoom magnification input of FIG. 4.
Figure 8:
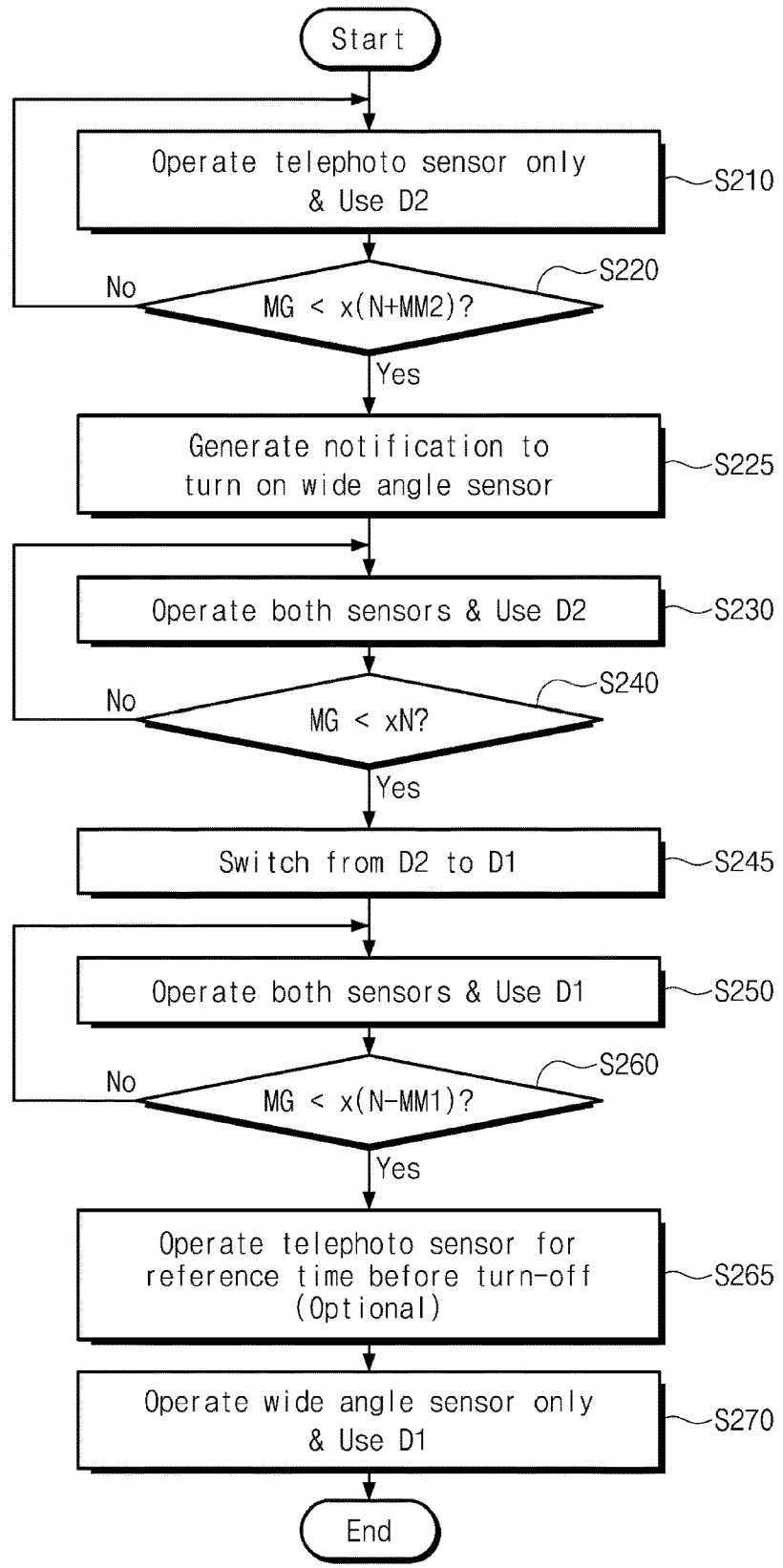
FIG. 8 is a flowchart describing example operations of image sensors of FIG. 2 associated with a zoom magnification input of FIG. 4.

FIG. 7 is a timing diagram for describing example operations of the image sensors 1121a and 1122a of FIG. 2 associated with a zoom magnification input of FIG. 4. FIG. 8 is a flowchart describing example operations of the image sensors 1121a and 1122a of FIG. 2 associated with a zoom magnification input of FIG. 4. FIGS. 7 and 8 may be associated with a case where the value of the zoom magnification MG slowly decreases, which may be understood as the opposite to the example of FIGS. 5 and 6.

In a time interval between time T20 and T21, the zoom magnification MG may be greater than or equal to the reference magnification of "×(N+MM2)", and only the telephoto sensor 1122a may operate. The main processor 1800 may generate the final image data based on the signal D2, and the output interface may output an image based on the signal D2 (S210 of FIG. 8).

The main processor 1800 may determine whether the zoom magnification MG becomes smaller than "×(N+MM2)" (S220 of FIG. 8). When the zoom magnification MG satisfies the first reference condition (e.g., when the zoom magnification MG becomes to be smaller than "×(N+MM2)") while only the telephoto sensor 1122a operates, the main processor 1800 may provide a notification NTF3 to the wide-angle sensor 1121a (S225 of FIG. 8).

At time T21, the wide-angle sensor 1121a may start to prepare to operate in response to the notification NTF3. For example, when the zoom magnification MG changes from a magnification greater than or equal to "×(N+MM2)" to a magnification smaller than "×(N+MM2)" while the wide-angle sensor 1121a does not operate, the wide-angle sensor 1121a may prepare to operate (PR) during a time interval t3 after the zoom magnification MG becomes smaller than "×(N+MM2)", and then may operate. The time interval t3 may be a preparation time interval in which the wide-angle sensor 1121a enters a state required to operate while starting to receive power. While the wide-angle sensor 1121a prepares to operate, the main processor 1800 and the output interface may use the signal D2 output from the telephoto sensor 1122a.

In a time interval between time T21 and T22, the zoom magnification MG may be between the reference magnification of "×(N+MM2)" and the switching magnification of "xN". After the wide-angle sensor 1121a completes preparation to operate (PR), the image sensors 1121a and 1122a may operate concurrently in the time interval between time T21+t3 and T22. Before the switching condition is determined, the main processor 1800 may generate the final image data based only on the signal D2 without the signal D1, and the output interface may output an image based only on the signal D2 (S230 of FIG. 8).

While the image sensors 1121a and 1122a operate concurrently, the main processor 1800 may determine whether the zoom magnification MG becomes smaller than "xN" (S240 of FIG. 8). When the zoom magnification MG becomes smaller than "xN", the main processor 1800 may determine the switching condition, and thus may provide switching from the signal D2 to the signal D1 at time T22 (S245 of FIG. 8).

After the time interval between time T21 and T22, in a time interval between time T22 and T23, the zoom magnification MG may be between the switching magnification of "xN" and the reference magnification of "×(N−MM1)". The image sensors 1121*a* and 1122*a* may operate concurrently. In response to the switching condition, the main processor 1800 may generate the final image data based only on the signal D1 without the signal D2, and the output interface may output an image based only on the signal D1 (S250 of FIG. 8).

The main processor 1800 may determine whether the zoom magnification MG becomes smaller than "×(N−MM1)" (S260 of FIG. 8). When the zoom magnification MG does not satisfy the second reference condition (e.g., when the zoom magnification MG becomes smaller than "×(N−MM1)") while the telephoto sensor 1122*a* outputs the signal D2, the main processor 1800 may provide a notification NTF4 to the telephoto sensor 1122*a*.

In some example embodiments, after a lapse of time T23, the telephoto sensor 1122*a* may immediately discontinue operating in response to the notification NTF4. For example, when the zoom magnification MG changes from a magnification greater than "xN" to a magnification smaller than "xN" while the telephoto sensor 1122*a* operates, the telephoto sensor 1122*a* may not operate after the zoom magnification MG becomes smaller than "×(N−MM1)".

Alternatively, in some example embodiments, when the zoom magnification MG changes from a magnification greater than or equal to "×(N−MM1)" to a magnification smaller than "×(N−MM1)" while the telephoto sensor 1122*a* operates, the telephoto sensor 1122*a* may additionally operate during a time interval t4 after the zoom magnification MG becomes smaller than "×(N−MM1)" (e.g., after time T23). And then, after a lapse of time T23+t4, the telephoto sensor 1122*a* may not operate (S265 of FIG. 8). The time interval t4 may be a reference time interval for further operating the telephoto sensor 1122*a* in response to the notification NTF4. The main processor 1800 and/or the telephoto sensor 1122*a* may use a timer circuit, a counter circuit, and/or the like, to measure the reference time interval t4.

In a time interval between time T23 and T24, the zoom magnification MG may be smaller than the reference magnification of "×(N−MM1)". After time T23 (or T23+t4), only the wide-angle sensor 1121*a* may operate. The main processor 1800 may generate the final image data based on the signal D1, and the output interface may output an image based on the signal D1 (S270 of FIG. 8).

When the first reference condition and the second reference condition are both satisfied, the image sensors 1121*a* and 1122*a* may output the signals D1 and D2 concurrently. As the wide-angle sensor 1121*a* outputs the signal D1 in advance while operating in the time interval between time T21+t3 and T22 before the switching to the signal D1 is actually provided, the switching from the signal D2 to the signal D1 may be rapidly provided in response to the switching magnification of "xN".

In some example embodiments, when the reference time interval t4 is provided, even though a user suddenly increases the value of the zoom magnification MG, a sufficient response time for re-switching to the signal D2 may be provided. A length of the reference time interval t4 may be variously selected to be suitable for stable switching, and may be fixed or variable.

A time interval between time T21+t3 and T23 (or T23+t4) may be a provision time interval in which the image sensors 1121*a* and 1122*a* operate concurrently to provide fast switching between the signals D1 and D2. For example, the provision time interval between time T21+t3 and T23+t4 may include the reference time interval t4.

Figure 9:
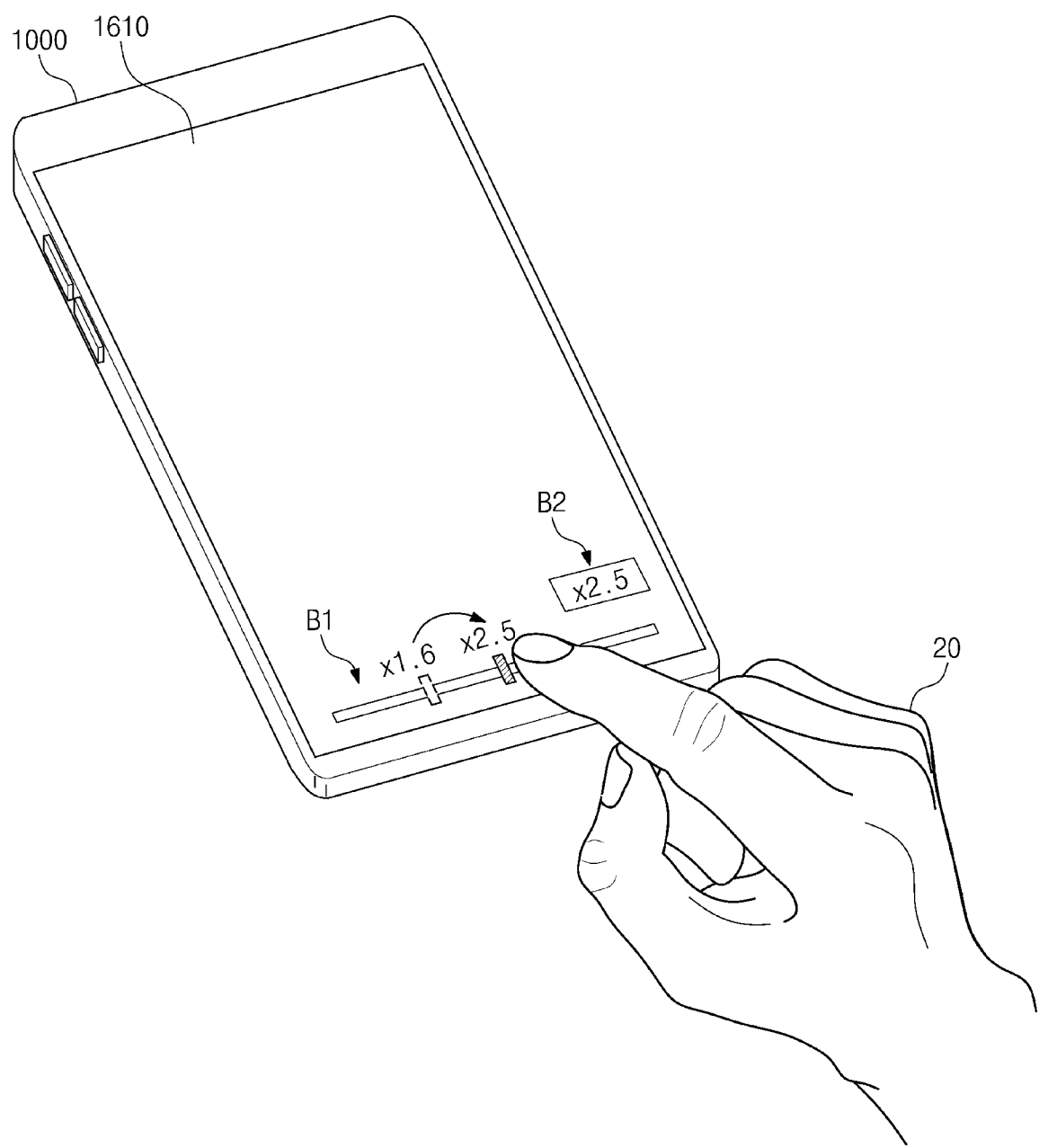
FIG. 9 is a conceptual diagram for describing an example method of inputting a zoom magnification for image sensors of FIG. 2 through a user interface of FIG. 2.

FIG. 9 is a conceptual diagram for describing an example method of inputting the zoom magnification MG for the image sensors 1121*a* and 1122*a* of FIG. 2 through the user interface 1600 of FIG. 2.

In some cases, the user 20 may intend to directly input a specific value of the zoom magnification MG to the user interface 1600. In this case, the zoom magnification MG may be discretely changed to the input specific value (zoom jump), instead of slowly increasing or decreasing.

For example, the user 20 may use the graphic interface B1 to input the specific value of the zoom magnification MG. As the user 20 touches a specific position of a slide bar of the graphic interface B1, the value of the zoom magnification MG may be jumped to a specific value corresponding to the touched specific position.

For another example, the user 20 may use a graphic interface B2 displayed on a display device of the user interface 1600 to change the value of the zoom magnification MG. The user 20 may directly input the specific value of the zoom magnification MG through the touch screen 1610 or a key/touch pad, and the graphic interface B2 may show the input value.

However, the above examples are provided to facilitate better understanding, and are not intended to limit the present disclosure. It may be readily understood that an interface for inputting the specific value of the zoom magnification MG may be variously changed or modified.

Figure 10:
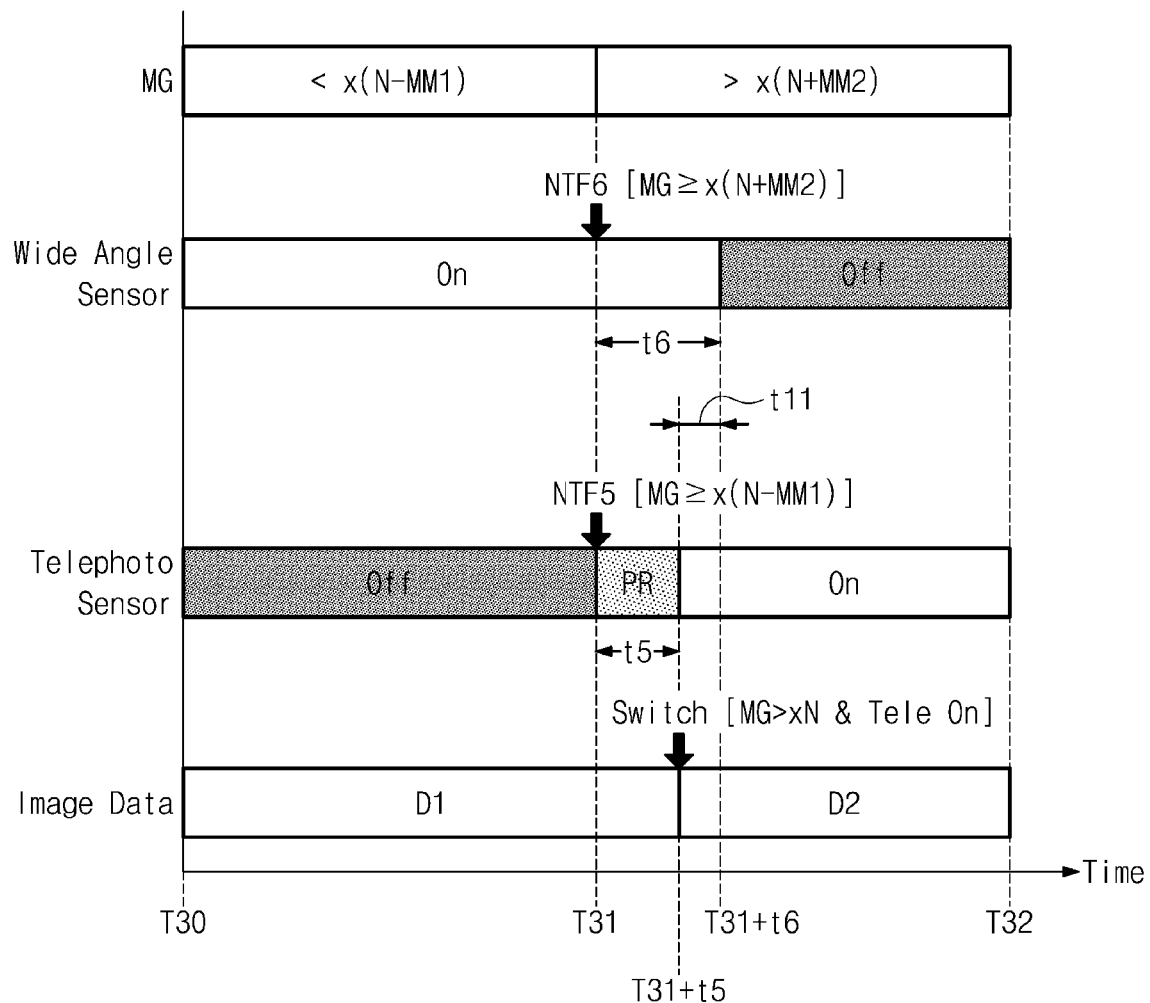
FIG. 10 is a timing diagram for describing example operations of image sensors of FIG. 2 associated with a zoom magnification input of FIG. 9.
Figure 11:
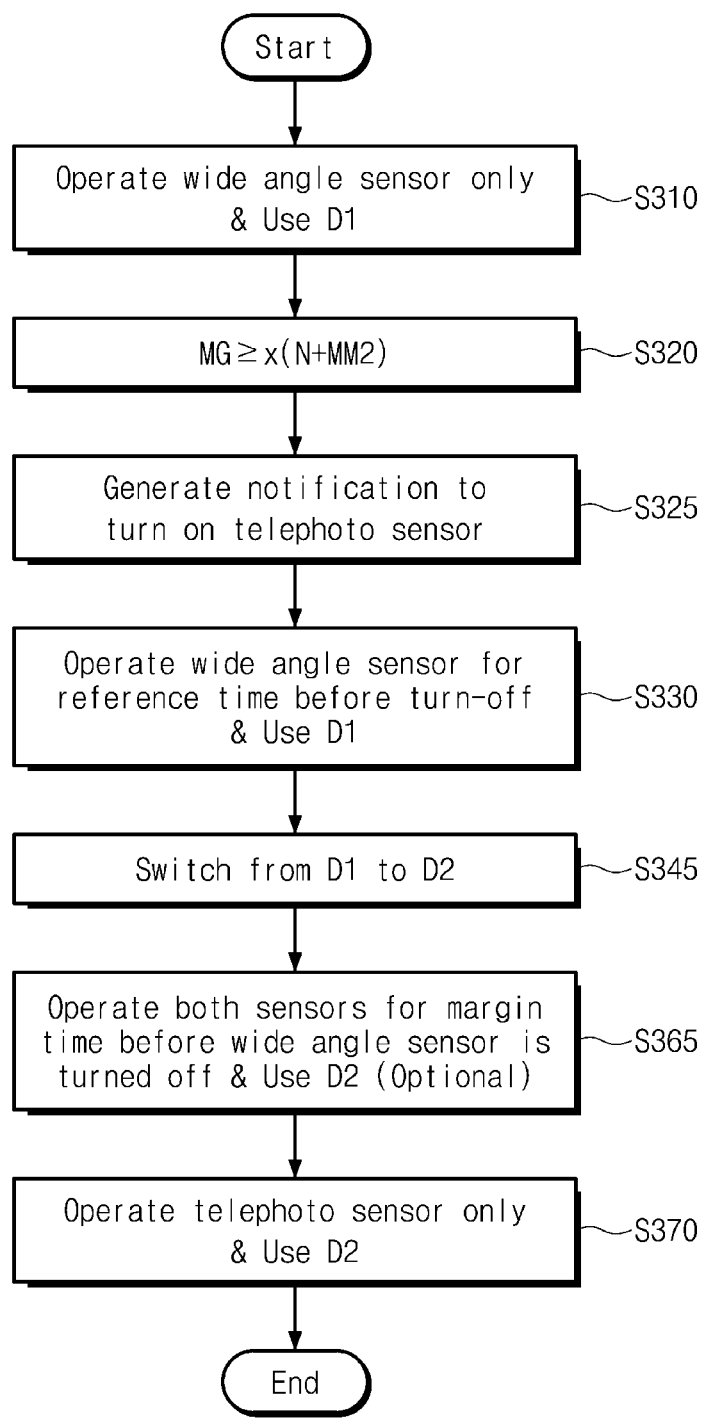
FIG. 11 is a flowchart describing example operations of image sensors of FIG. 2 associated with a zoom magnification input of FIG. 9.

FIG. 10 is a timing diagram for describing example operations of the image sensors 1121*a* and 1122*a* of FIG. 2 associated with a zoom magnification input of FIG. 9. FIG. 11 is a flowchart describing example operations of the image sensors 1121*a* and 1122*a* of FIG. 2 associated with a zoom magnification input of FIG. 9. FIGS. 10 and 11 may be associated with a case of directly inputting the specific value of the zoom magnification MG such that the zoom magnification MG increases.

In a time interval between time T30 and T31, the zoom magnification MG may be smaller than the reference magnification of "×(N−MM1)". Only the wide-angle sensor 1121*a* may operate, and the telephoto sensor 1122*a* may not operate. The main processor 1800 may generate the final image data based on the signal D1, and the output interface may output an image based on the signal D1 (S310 of FIG. 11).

For example, as a user inputs the specific value of the zoom magnification MG, at time T31, the main processor 1800 may determine that the zoom magnification MG does not satisfy the first reference condition (e.g., becomes greater than or equal to "×(N+MM2)") and does satisfy the second reference condition (e.g., becomes greater than or equal to "×(N−MM1)") while only the wide-angle sensor 1121*a* operates (S320 of FIG. 11). In this case, the main processor 1800 may provide a notification NTF5 to the telephoto sensor 1122*a* (S325 of FIG. 11), and may provide a notification NTF6 to the wide-angle sensor 1121*a*.

At time T31, the telephoto sensor 1122*a* may start to prepare to operate in response to the notification NTF5. For example, when the zoom magnification MG changes from a magnification smaller than "×(N−MM1)" to a magnification greater than or equal to "×(N−MM1)" while the telephoto sensor 1122*a* does not operate, the telephoto sensor 1122*a* may prepare to operate (PR) during a time interval t5 after the zoom magnification MG becomes greater than or equal to "×(N−MM1)", and then may operate. The time interval t5 may be a preparation time interval in which the telephoto sensor 1122*a* enters a state required to operate while starting to receive power.

Even though the first reference condition becomes unsatisfied, while the telephoto sensor 1122a prepares to operate, the wide-angle sensor 1121a may further operate during a time interval t6 after receiving the notification NTF6 (S330 of FIG. 11). When the zoom magnification MG changes from a magnification smaller than "×(N+MM2)" to a magnification greater than or equal to "×(N+MM2)" while the wide-angle sensor 1121a operates, the wide-angle sensor 1121a may additionally operate during the time interval t6 after the zoom magnification MG becomes to be greater than or equal to "×(N+MM2)" (e.g., after time T31). And then, after a lapse of the time interval t6, the wide-angle sensor 1121a may not operate.

Before the telephoto sensor 1122a completes its preparation to operate in the time interval t5, the switching from the signal D1 to the signal D2 may not be provided. Accordingly, the main processor 1800 and the output interface may use the signal D1. As the second reference condition becomes satisfied concurrently with the first reference condition becoming unsatisfied, while the wide-angle sensor 1121a outputs the signal D1 during the time interval t6, the telephoto sensor 1122a may output the signal D2 after completing its preparation to operate.

The time interval t6 may include a reference time interval in which the wide-angle sensor 1121a outputs the signal D1 while the telephoto sensor 1122a does not complete preparation to operate (and thus does not output the signal D2). The main processor 1800 and/or the wide-angle sensor 1121a may use a timer circuit, a counter circuit, and/or the like, to measure the time interval t6.

As the user inputs the specific value of the zoom magnification MG, the main processor 1800 may determine that the switching condition occurs (e.g., that the zoom magnification MG changes from a magnification smaller than "xN" to a magnification greater than "xN"). Accordingly, at time T31+t5 where the telephoto sensor 1122a starts to output the signal D2 after completing preparation to operate (PR), the main processor 1800 may provide the switching from the signal D1 to the signal D2 (S345 of FIG. 11). When the zoom magnification MG is jumped to the specific value, a change of an image which is output from the output interface may be considerable, and thus it is likely that the user does not feel unnatural from the image change which is due to the sudden switching from the signal D1 to the signal D2.

In some example embodiments, the reference time interval t6 may be selected such that the wide-angle sensor 1121a stops operating immediately after a lapse of time T31+t5. The wide-angle sensor 1121a may not operate after stopping operating. When the zoom magnification MG changes from a magnification smaller than "xN" to a magnification greater than "xN" while the wide-angle sensor 1121a operates, the wide-angle sensor 1121a may not operate after the zoom magnification MG becomes to be greater than or equal to "×(N+MM2)".

Alternatively, in some example embodiments, the reference time interval t6 may be selected such that the wide-angle sensor 1121a additionally operates during a margin time interval t11 after a lapse of time T31+t5. During the margin time interval t11 after the telephoto sensor 1122a completes preparation to operate, the image sensors 1121a and 1122a may operate concurrently.

However, in response to the switching condition, the main processor 1800 may generate the final image data based only on the signal D2 without the signal D1, and the output interface may output an image based only on the signal D2 (S365 of FIG. 11). The wide-angle sensor 1121a may not operate after a lapse of the margin time interval t11.

The margin time interval t11 may be a provision time interval in which the image sensors 1121a and 1122a operate concurrently even after the switching to the signal D2 is provided. For example, the reference time interval t6 may include the provision time interval t11. When the provision time interval t11 is provided, even though a user suddenly decreases the value of the zoom magnification MG, a sufficient response time for re-switching to the signal D1 may be provided. Accordingly, the switching between the signals D1 and D2 may be stably provided. A length of the provision time interval t11 may be variously selected to be suitable for stable switching, and may be fixed or variable.

In a time interval between time T31 and T32, the zoom magnification MG may be greater than or equal to the reference magnification of "×(N+MM2)". After time T31+t5 (or T31+t6), while the wide-angle sensor 1121a does not operate, only the telephoto sensor 1122a may operate. The main processor 1800 may generate the final image data based on the signal D2, and the output interface may output an image based on the signal D2 (S370 of FIG. 11).

Figure 12:
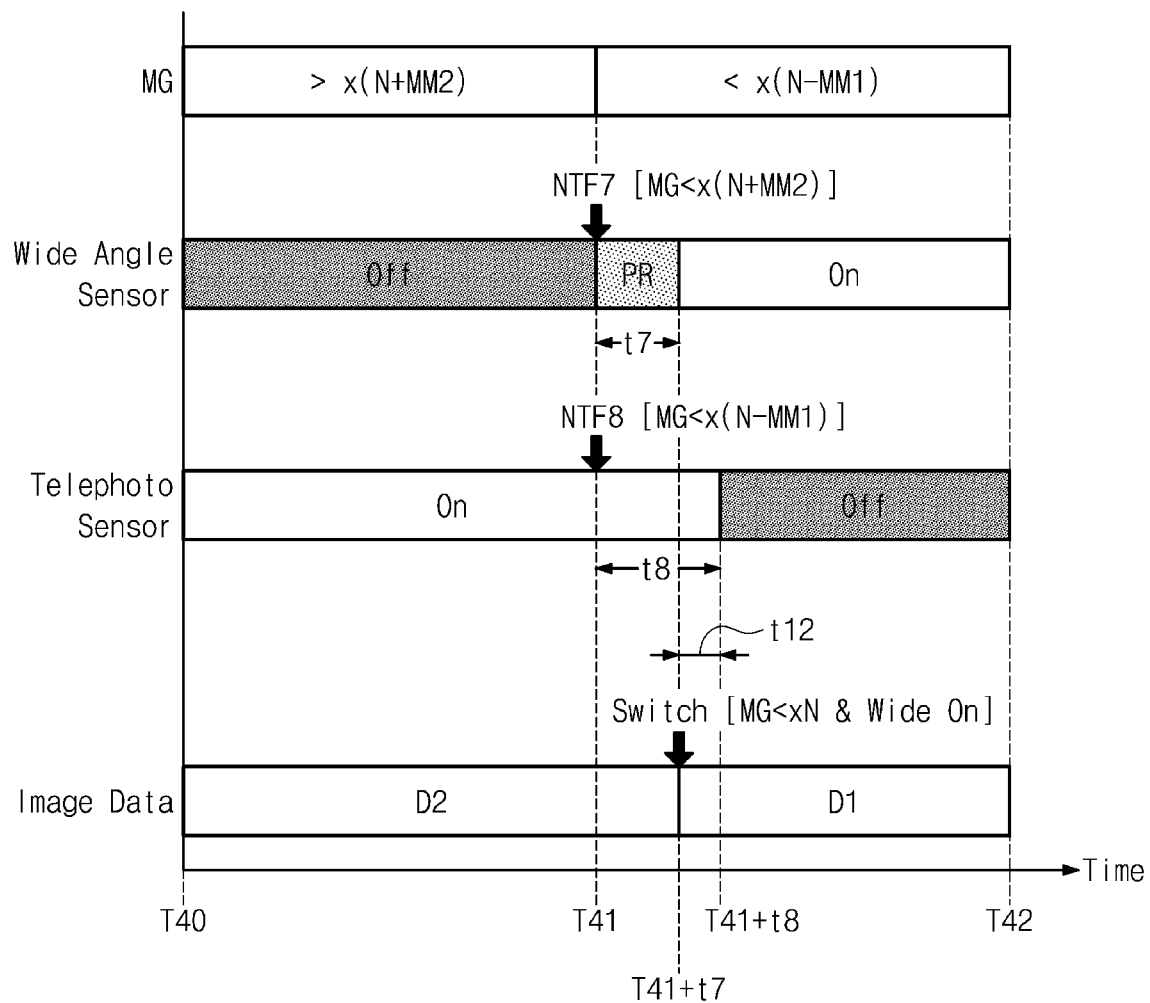
FIG. 12 is a timing diagram for describing example operations of image sensors of FIG. 2 associated with a zoom magnification input of FIG. 9.
Figure 13:
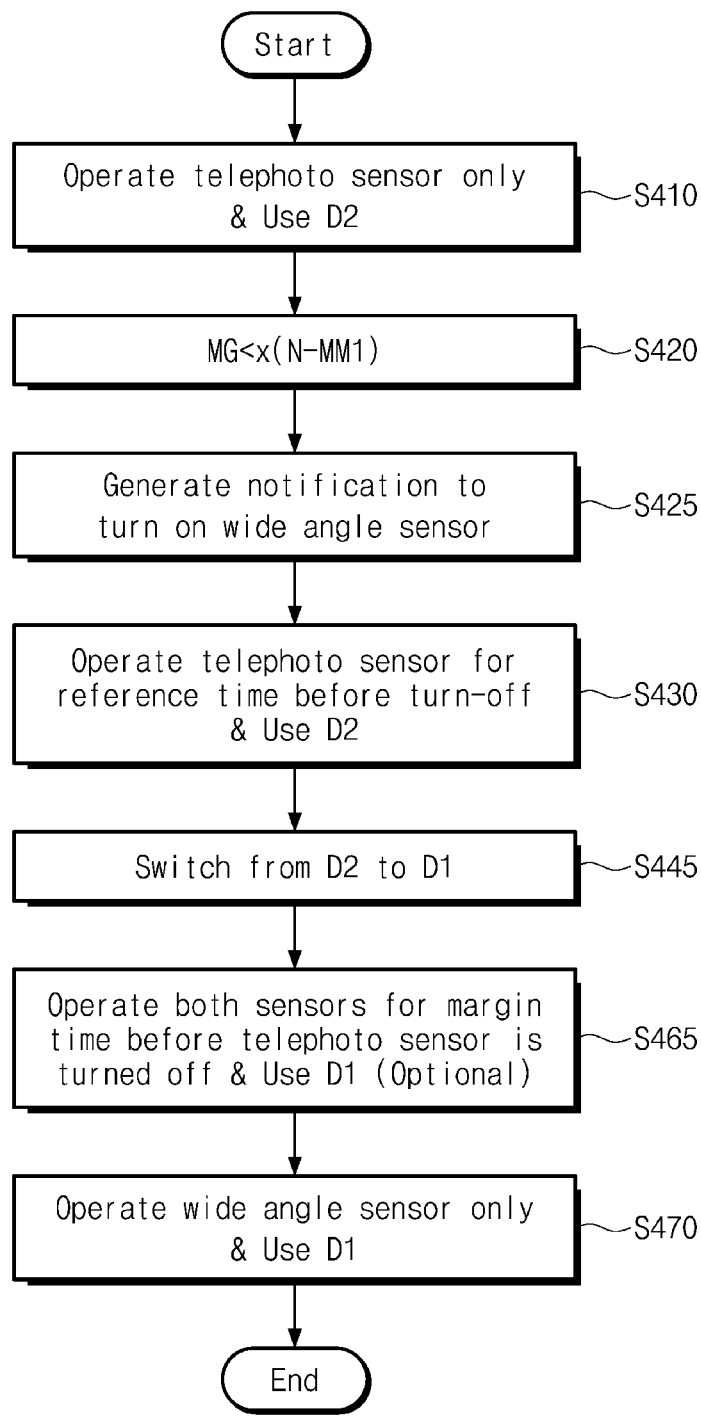
FIG. 13 is a flowchart describing example operations of image sensors of FIG. 2 associated with a zoom magnification input of FIG. 9.

FIG. 12 is a timing diagram for describing example operations of the image sensors 1121a and 1122a of FIG. 2 associated with a zoom magnification input of FIG. 9. FIG. 13 is a flowchart describing example operations of the image sensors 1121a and 1122a of FIG. 2 associated with a zoom magnification input of FIG. 9. FIGS. 12 and 13 may be associated with a case of directly inputting the specific value of the zoom magnification MG such that the zoom magnification MG decreases, which may be understood as the opposite to the example of FIGS. 10 and 11.

In a time interval between time T40 and T41, the zoom magnification MG may be greater than or equal to the reference magnification of "×(N+MM2)", and only the telephoto sensor 1122a may operate. The main processor 1800 may generate the final image data based on the signal D2, and the output interface may output an image based on the signal D2 (S410 of FIG. 13).

For example, at time T41, a user may input the specific value of the zoom magnification MG. The main processor 1800 may determine that the zoom magnification MG does not satisfy the second reference condition (e.g., becomes smaller than "×(N−MM1)") but satisfies the first reference condition (e.g., becomes to be smaller than "×(N+MM2)") while only the telephoto sensor 1122a operates (S420 of FIG. 13). In this case, the main processor 1800 may provide a notification NTF7 to the wide-angle sensor 1121a (S425 of FIG. 13), and may provide a notification NTF8 to the telephoto sensor 1122a.

At time T41, when the zoom magnification MG changes from a magnification greater than or equal to "×(N+MM2)" to a magnification smaller than "×(N+MM2)" while the wide-angle sensor 1121a does not operate, the wide-angle sensor 1121a may prepare to operate (PR) during a time interval t7 in response to the notification NTF7 after the zoom magnification MG becomes smaller than "×(N+MM2)", and then may operate. The time interval t7 may be a preparation time interval in which the wide-angle sensor 1121a enters a state required to operate while starting to receive power.

Even though the second reference condition becomes unsatisfied, while the wide-angle sensor 1121a prepares to operate, the telephoto sensor 1122a may further operate during a time interval t8 after receiving the notification NTF8 (S430 of FIG. 13). When the zoom magnification MG changes from a magnification greater than or equal to "×(N−MM1)" to a magnification smaller than "×(N−MM1)" while the telephoto sensor 1122a operates, the telephoto sensor 1122a may additionally operate during the time interval t8 after the zoom magnification MG becomes to be smaller than "×(N−MM1)" (e.g., after time T41). And then, after a lapse of the time interval t8, the telephoto sensor 1122a may not operate.

Because the wide-angle sensor 1121a does not complete preparation to operate before the time interval t7, the switching from the signal D2 to the signal D1 may not be provided. Accordingly, the main processor 1800 and the output interface may use the signal D2. As the first reference condition becomes satisfied concurrently with the second reference condition becoming unsatisfied, while the telephoto sensor 1122a outputs the signal D2 during the time interval t8, the wide-angle sensor 1121a may output the signal D1 after completing preparation to operate.

The time interval t8 may include a period in which the telephoto sensor 1122a outputs the signal D2 while the wide-angle sensor 1121a does not complete preparation to operate (and thus does not output the signal D1). The main processor 1800 and/or the telephoto sensor 1122a may use a timer circuit, a counter circuit, and/or the like, to measure the time interval t8.

The main processor 1800 may determine that the switching condition occurs. Accordingly, at time T41+t7 where the wide-angle sensor 1121a starts to output the signal D1 after completing preparation to operate (PR), the main processor 1800 may provide the switching from the signal D2 to the signal D1 (S445 of FIG. 13).

In some example embodiments, the reference time interval t8 may be selected such that the telephoto sensor 1122a stops operating immediately after a lapse of time T41+t7. The telephoto sensor 1122a may not operate after stopping operation. When the zoom magnification MG changes from a magnification greater than "xN" to a magnification smaller than "xN" while the telephoto sensor 1122a operates, the telephoto sensor 1122a may not operate after the zoom magnification MG becomes smaller than "×(N−MM1)".

Alternatively, in some example embodiments, the reference time interval t8 may be selected such that the telephoto sensor 1122a additionally operates during a margin time interval t12 after a lapse of time T41+t7. During the margin time interval t12 after the wide-angle sensor 1121a completes preparation to operate (PR), the image sensors 1121a and 1122a may operate concurrently.

However, in response to the switching condition, the main processor 1800 may generate the final image data based only on the signal D1 without the signal D2, and the output interface may output an image based only on the signal D1 (S465 of FIG. 13). The telephoto sensor 1122a may not operate after a lapse of the margin time interval t12.

The margin time interval t12 may be a provision time interval in which the image sensors 1121a and 1122a operate concurrently even after the switching to the signal D1 is provided. For example, the reference time interval t8 may include the provision time interval t12. When the provision time interval t12 is provided, even though a user suddenly increases the value of the zoom magnification MG, a sufficient response time for re-switching to the signal D2 may be provided. A length of the provision time interval t12 may be variously selected to be suitable for stable switching, and may be fixed or variable.

In a time interval between time T41 and T42, the zoom magnification MG may be smaller than the reference magnification of "×(N−MM1)". After time T41+t7 (or T41+t8), while the telephoto sensor 1122a does not operate, only the wide-angle sensor 1121a may operate. The main processor 1800 may generate the final image data based on the signal D1, and the output interface may output an image based on the signal D1 (S470 of FIG. 13).

Information of the magnifications of "xN", "×(N−MM1)", and "×(N+MM2)" and information of the reference time intervals t2, t4, t6, and t8, which have been described above, may be stored in an internal memory of the main processor 1800, the buffer memory 1400, and/or the nonvolatile memory 1500 or may be stored in another type of memory (e.g., a register), and additionally or alternatively, may be inserted into a program code which is executed by the main processor 1800.

Figure 14:
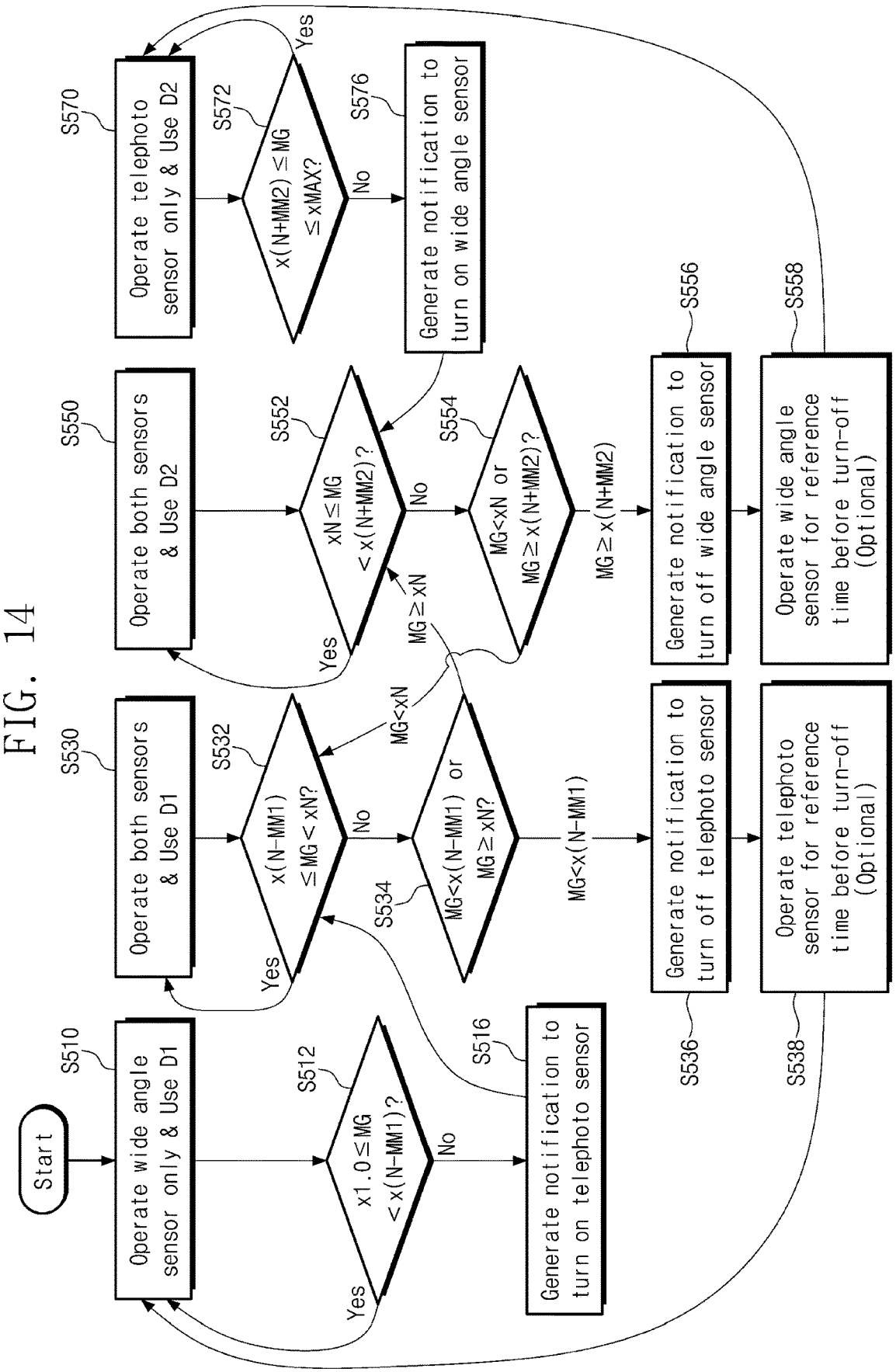
FIG. 14 is a flowchart describing example operations of image sensors of FIG. 2.

FIG. 14 is a flowchart describing example operations of the image sensors 1121a and 1122a of FIG. 2.

In some example embodiments, an initial value of the zoom magnification MG may be selected as the minimum magnification of "×1.0". For example, when image capturing initiates (e.g., when the application AP is executed), only the wide-angle sensor 1121a may operate, and the signal D1 may be used (S510). If the zoom magnification MG is between "×1.0" and "×(N−MM1)" (Yes of S512), only the wide-angle sensor 1121a may operate (S510).

If not (No of S512), a notification may be generated under control of the main processor 1800 to prepare an operation of the telephoto sensor 1122a (S516). If the zoom magnification MG is between "×(N−MM1)" and "xN" (Yes of S532), the image sensors 1121a and 1122a may operate concurrently, but only the signal D1 may be used (S530).

If not (No of S532), it may be determined whether the zoom magnification MG becomes smaller than "×(N−MM1)" or becomes greater than or equal to "xN" (S534). When the zoom magnification MG becomes smaller than "×(N−MM1)", a notification may be generated under control of the main processor 1800 to stop the operation of the telephoto sensor 1122a (S536). In some example embodiments, the telephoto sensor 1122a may additionally operate during a reference time interval in response to the notification, and then may not operate (S538).

If the zoom magnification MG becomes to be greater than or equal to "×(N)" and is between "xN" and "×(N+MM2)" (Yes of S552), the image sensors 1121a and 1122a may operate concurrently, and only the signal D2 may be used according to the switching from the signal D1 to the signal D2 (S550). If not (No of S552), it may be determined whether the zoom magnification MG becomes smaller than "xN" or becomes to be greater than or equal to "×(N+MM2)" (S554). When the zoom magnification MG becomes smaller than "xN", it may be determined whether the zoom magnification MG is between "×(N−MM1)" and "xN" (S532).

When the zoom magnification MG becomes greater than or equal to "×(N+MM2)", a notification may be generated under control of the main processor 1800 to stop the operation of the wide-angle sensor 1121a (S556). In some example embodiments, the wide-angle sensor 1121a may additionally operate during a reference time interval in response to the notification, and then may not operate (S558).

Afterwards, only the telephoto sensor 1122a may operate, and the signal D2 may be used (S570). If the zoom magnification MG is between "×(N+MM2)" and "xMAX" (Yes of S572), only the telephoto sensor 1122a may operate (S570). If not (No of S572), a notification may be generated under control of the main processor 1800 to prepare an operation of the wide-angle sensor 1121a (S576). And then, it may be determined whether the zoom magnification MG is between "xN" and "x(N+MM2)" (S552).

In the above descriptions, it has been described that two image sensors 1121a and 1122a are the wide-angle sensor 1121a and the telephoto sensor 1122a. However, types of two image sensors may be variously changed or modified without being limited to the above descriptions. In other example embodiments, two image sensors may be image sensors of a stereo camera for capturing a left-viewed image and a right-viewed image, or may be an image sensor for a rear camera and an image sensor for a front camera. In such example embodiments, when switching between signals output from the image sensors is required, as the image sensors operate concurrently before the switching condition occurs, natural switching may be provided.

FIG. 15 is a block diagram illustrating an example configuration associated with the image processing block 1100 of FIG. 1. For example, the image processing block 1100 of FIG. 1 may include an image processing block 1100b of FIG. 15.

The image processing block 1100b may be implemented in a multi-sensor structure including three or more image sensors 1121b, 1122b, and 1129b. The image processing block 1100b may include lenses 1111b, 1112b, and 1119b, the image sensors 1121b, 1122b, and 1129b, and actuators 1141b, 1142b, and 1149b. For example, the image sensors 1121b, 1122b, and 1129b may be used to constitute an array camera, a multi-camera, and/or the like.

The lenses 1111b, 1112b, and 1119b may correspond to the lenses 1111a and 1112a of FIG. 2. The image sensors 1121b, 1122b, and 1129b may correspond to the image sensors 1121a and 1122a of FIG. 2, and may output signals D11, D12, and D13 associated with an image of the object 10.

The image signal processor 1130 may perform signal processing on the signals D11, D12, and D13. The main processor 1800 may control the image sensors 1121b, 1122b, and 1129b and the actuators 1141b, 1142b, and 1149b.

As illustrated in FIG. 15, the example embodiments may be employed irrespective of the number of image sensors. For example, when the switching between the signals D11, D12, and D13 is required with regard to the three image sensors 1121b, 1122b, and 1129b, as the image sensors 1121b, 1122b, and 1129b operate concurrently before the switching condition occurs, natural switching may be provided.

Figure 16:
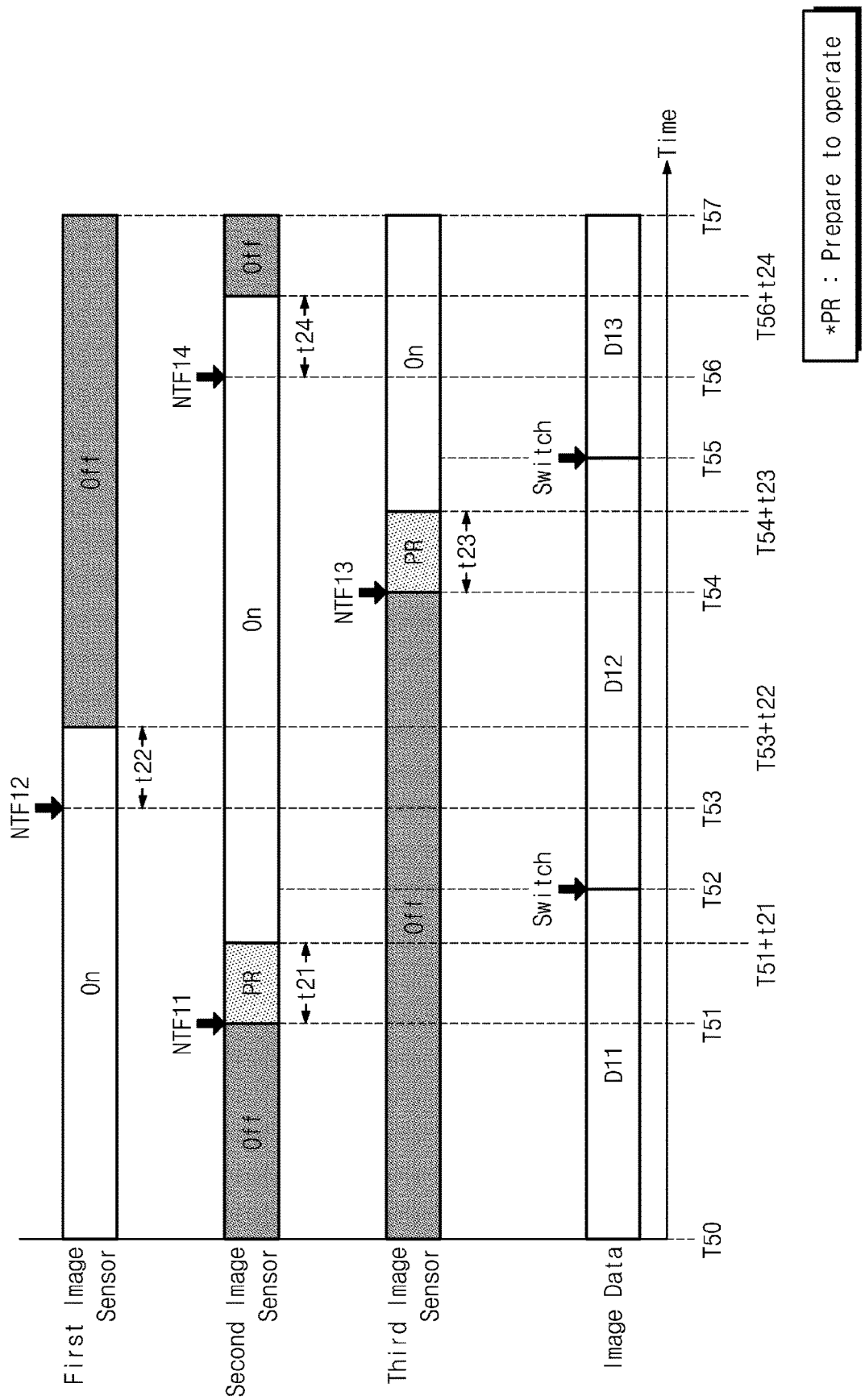
FIG. 16 is a timing diagram for describing example operations of image sensors of FIG. 15.

FIG. 16 is a conceptual diagram for describing example operations of the image sensors 1121b, 1122b, and 1129b of FIG. 15.

In a time interval between time T50 and T51, only the first image sensor 1121b may operate, and the signal D11 may be used. At time T51, when a reference condition for operating the second image sensor 1122b is satisfied, the second image sensor 1122b may prepare to operate (PR) during a preparation time interval t21 in response to a notification NTF11, and then may operate.

At time T52, when the switching condition is determined, the switching from the signal D11 to the signal D12 may be provided, and the signal D12 may be used. As the second image sensor 1122b outputs the signal D12 in advance before the switching condition occurs, the switching from the signal D11 to the signal D12 may be provided rapidly and naturally.

At time T53, a reference condition for stopping the operation of the first image sensor 1121b may be satisfied. In some example embodiments, the first image sensor 1121b may additionally operate during a reference time interval t22 in response to a notification NTF12, and then may not operate. When the reference time interval t22 is provided, re-switching to the signal D11 may be rapidly provided.

At time T54, when a reference condition for operating the third image sensor 1129b is satisfied, the third image sensor 1129b may prepare to operate (PR) during a preparation time interval t23 in response to a notification NTF13, and then may operate.

At time T55, when the switching condition is determined, the switching from the signal D12 to the signal D13 may be provided. Accordingly, in a time interval between time T55 and T57, the signal D13 may be used. As the third image sensor 1129b outputs the signal D13 in advance before the switching condition occurs, the switching from the signal D12 to the signal D13 may be provided rapidly and naturally.

At time T56, a reference condition for stopping the operation of the second image sensor 1122b may be satisfied. In some example embodiments, the second image sensor 1122b may additionally operate during a reference time interval t24 in response to a notification NTF14n and then may not operate. When the reference time interval t24 is provided, re-switching to the signal D12 may be rapidly provided.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The above descriptions are intended to provide example configurations and operations for implementing the present disclosure. The present disclosure may include implementations which may be obtained by simply changing or modifying the above example embodiments, in addition to the above-described example embodiments. Also, the present disclosure may include implementations which may be accomplished by easily changing or modifying the above-described example embodiments in the future.

What is claimed is:

1. An electronic device comprising:
    an input interface to receive a zoom magnification;
    a wide-angle sensor to operate when the zoom magnification is smaller than a first reference magnification;
    a telephoto sensor to:
        operate when the zoom magnification is greater than a second reference magnification which is smaller than the first reference magnification, and operate concurrently with the wide-angle sensor when the zoom magnification is between the second reference magnification and the first reference magnification; and an output interface to:
output a first image based on a first signal from the wide-angle sensor when the zoom magnification is smaller than a switching magnification which is between the second reference magnification and the first reference magnification, and output a second image based on a second signal from the telephoto sensor when the zoom magnification is greater than the switching magnification.

2. The electronic device of claim 1, wherein when the zoom magnification is between the second reference magnification and the switching magnification while the wide-angle sensor and the telephoto sensor operate concurrently, the output interface outputs the first image based only on the first signal without the second signal.

3. The electronic device of claim 1, wherein when the zoom magnification changes from a magnification smaller than the switching magnification to a magnification greater than the switching magnification while the wide-angle sensor operates, the wide-angle sensor does not operate after the zoom magnification becomes greater than the first reference magnification.

4. The electronic device of claim 1, wherein when the zoom magnification changes from a magnification smaller than the first reference magnification to a magnification greater than the first reference magnification while the wide-angle sensor operates, the wide-angle sensor operates during a reference time interval after the zoom magnification becomes greater than the first reference magnification and then does not operate.

5. The electronic device of claim 1, wherein:
the wide-angle sensor does not operate when the zoom magnification is greater than the first reference magnification, and when the zoom magnification changes from a magnification greater than the first reference magnification to a magnification smaller than the first reference magnification while the wide-angle sensor does not operate, the wide-angle sensor prepares to operate during a preparation time interval after the zoom magnification becomes smaller than the first reference magnification and then operates.

6. The electronic device of claim 5, wherein while the wide-angle sensor prepares to operate, the output interface outputs the second image based only on the second signal without the first signal as the telephoto sensor operates.

7. The electronic device of claim 5, wherein after the wide-angle sensor completes the preparation to operate, the wide-angle sensor and the telephoto sensor are to operate concurrently during a provision time interval.

8. An electronic device comprising:
a first image sensor to output a first signal when a first reference condition is satisfied; and
a second image sensor to output a second signal when a second reference condition different from the first reference condition is satisfied, wherein:
when both the first reference condition and the second reference condition are satisfied, the first image sensor outputs the first signal concurrently with the second image sensor outputting the second signal,
when the first reference condition becomes not being satisfied while the first image sensor outputs the first signal, the first image sensor outputs the first signal during a reference time interval after the first reference condition becomes not being satisfied and then does not output the first signal, and
the second image sensor outputs the second signal while the first image sensor does not output the first signal.

9. The electronic device of claim 8, further comprising an image signal processor to:
receive the first signal from the first image sensor when the first reference condition is satisfied,
receive the second signal from the second image sensor when the second reference condition is satisfied, and
receive both the first signal from the first image sensor and the second signal from the second image sensor when both the first reference condition and the second reference condition are satisfied.

10. The electronic device of claim 8, wherein as the second reference condition is satisfied before the first reference condition becomes not being satisfied, the first image sensor and the second image sensor are to output the first signal and the second signal concurrently.

11. The electronic device of claim 10, further comprising a main processor to provide switching between the first signal and the second signal, to generate final image data based only on one of the first signal and the second signal, according to a switching condition which is determined while both the first reference condition and the second reference condition are satisfied.

12. The electronic device of claim 8, wherein as the second reference condition is satisfied concurrently with the first reference condition becoming not being satisfied, the second image sensor completes a preparation to operate while the first image sensor outputs the first signal during the reference time interval and then outputs the second signal.

13. The electronic device of claim 12, further comprising a main processor to provide switching from the first signal to the second signal, to generate final image data based on the second signal, as the second image sensor outputs the second signal in the reference time interval.

14. An electronic device comprising:
a first image sensor to operate when a first reference condition is satisfied; and
a second image sensor to operate when a second reference condition different from the first reference condition is satisfied, wherein:
when the second reference condition becomes satisfied while only the first image sensor operates, the first image sensor operates while the second image sensor prepares to operate, and
after the second image sensor completes the preparation to operate, the first image sensor and the second image sensor are to operate concurrently during a provision time interval,
wherein the first image sensor outputs a first signal while operating, the second image sensor outputs a second signal while operating, and switching from the first signal to the second signal is provided according to a switching condition which is determined while the first image sensor and the second image sensor operate concurrently to output the first signal and the second signal.

15. The electronic device of claim 14, wherein when the first reference condition becomes not being satisfied in the provision time interval, the first image sensor does not operate after a lapse of the provision time interval.

16. The electronic device of claim 14, further comprising:

an output interface to output a final image based selectively on the first signal or the second signal, wherein when the switching condition is determined while the output interface outputs the final image based on one of the first signal and the second signal, the output interface outputs the final image based on another one of the first signal and the second signal.

17. The electronic device of claim 14, wherein:

when the first reference condition becomes not being satisfied after the switching from the first signal to the second signal is provided, the first image sensor operates during a first reference time interval after the first reference condition becomes not being satisfied and then does not operate, and the provision time interval includes the first reference time interval.

18. The electronic device of claim 14, wherein:

the first reference condition becomes not being satisfied concurrently with the second reference condition becoming satisfied, the first image sensor operates during a second reference time interval after the first reference condition becomes not being satisfied and then does not operate, and the second reference time interval includes the provision time interval.

19. The electronic device of claim 18, wherein:

switching from the first signal to the second signal is not provided while the second image sensor has not completed the preparation to operate in the second reference time interval.

20. The electronic device of claim 19, wherein:

the switching from the first signal to the second signal is provided after the second image sensor completes the preparation to operate in the second reference time interval, and after the switching from the first signal to the second signal is provided, the first image sensor and the second image sensor are to operate concurrently during the provision time interval.

* * * * *